US010681677B2

(12) United States Patent
Ghosh et al.

(10) Patent No.: US 10,681,677 B2
(45) Date of Patent: Jun. 9, 2020

(54) COORDINATED TRANSMISSIONS AMONG VIRTUAL ACCESS POINTS (VAPS)

(71) Applicant: Intel Corporation, Santa Clara, CA (US)

(72) Inventors: Chittabrata Ghosh, Fremont, CA (US); Yaron Alpert, Hod Hasharoni (IL)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 15/391,496

(22) Filed: Dec. 27, 2016

(65) Prior Publication Data

US 2018/0184401 A1 Jun. 28, 2018

(51) Int. Cl.
| | |
|---|---|
| *H04W 72/04* | (2009.01) |
| *H04W 8/22* | (2009.01) |
| H04W 88/08 | (2009.01) |
| H04W 84/12 | (2009.01) |
| H04W 24/02 | (2009.01) |

(52) U.S. Cl.
CPC .............. *H04W 72/04* (2013.01); *H04W 8/22* (2013.01); *H04W 24/02* (2013.01); *H04W 84/12* (2013.01); *H04W 88/08* (2013.01)

(58) Field of Classification Search
CPC ....... H04W 72/04; H04W 8/22; H04W 48/20; H04W 84/12; H04W 88/08
USPC ......................................................... 370/329
See application file for complete search history.

(56) References Cited

U.S. PATENT DOCUMENTS

| | | | |
|---|---|---|---|
| 2010/0093354 A1* | 4/2010 | Agashe ................. | H04W 36/04 455/436 |
| 2015/0006737 A1* | 1/2015 | Chen ..................... | H04L 5/0044 709/226 |
| 2016/0315675 A1* | 10/2016 | Seok ..................... | H04B 7/0452 |
| 2017/0055270 A1* | 2/2017 | Caretti ................. | H04W 72/12 |
| 2017/0208625 A1* | 7/2017 | Choi ...................... | H04L 27/26 |
| 2018/0376423 A1* | 12/2018 | Atefi ................... | H04W 52/146 |

* cited by examiner

*Primary Examiner* — Chi Tang P Cheng
(74) *Attorney, Agent, or Firm* — Schwegman Lundberg & Woessner, P.A.

(57) ABSTRACT

Methods, apparatuses, computer readable media for coordinated transmission among virtual access points (VAPs). An apparatus of a wireless device comprising processing circuitry is disclosed. The processing circuitry is configured to determine to share a multi-station uplink (UL) and/or downlink (DL) transmission opportunity (TXOP) with two stations that are associated with two virtual access points (VAPs), where each of the two stations is associated with one of the two VAPs. The processing circuitry further configured to determine UL resource allocations for the two stations for a trigger frame based on information received from the two VAPs, and to encode the trigger frame for the multi-station UL TXOP, the trigger frame comprising a common VAP identification (ID) of the two VAPs, UL resource allocations for the two stations, and multi-basic service set (M-BSS) identifications (IDs) for each of the two stations.

22 Claims, 13 Drawing Sheets

COORDINATED TRANSMISSIONS AMONG VIRTUAL ACCESS POINTS (VAPS)

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate computer readable media, methods, and apparatuses to coordinate transmissions among virtual access points (VAPs). Some embodiments relate to coordinated transmission among VAPs.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, the wireless devices may be moving and the signal quality may be changing. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
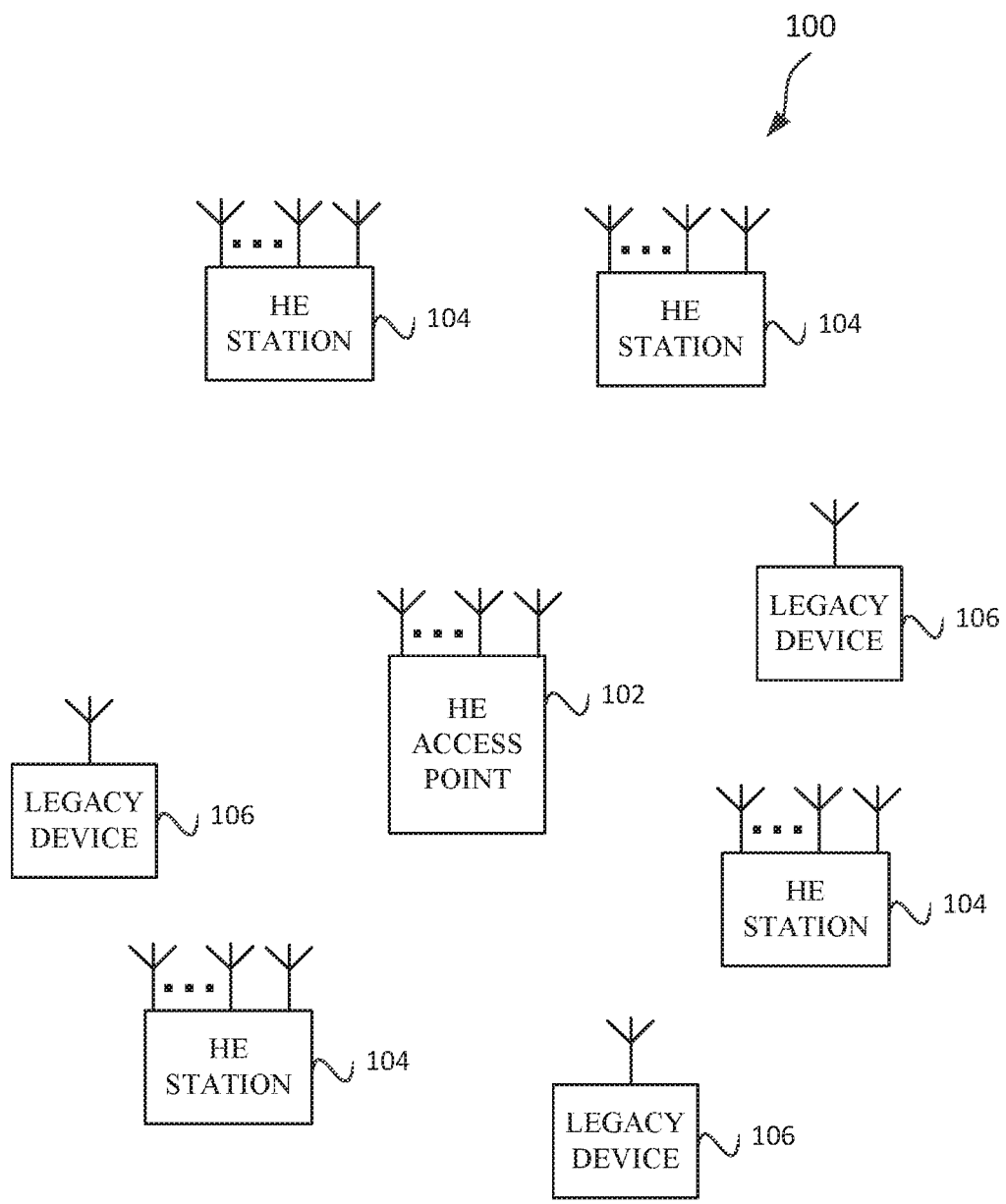
FIG. 1 illustrates a WLAN in accordance with some embodiments.

FIG. 1 illustrates a WLAN 100 in accordance with some embodiments. The WLAN 100 may comprise a basis service set (BSS) 100 that may include a HE access point 102, which may be an AP, a plurality of high-efficiency wireless (e.g., IEEE 802.11ax) (HE) stations 104, and a plurality of legacy (e.g., IEEE 802.11n/ac) devices 106.

The HE access point 102 may be an AP using the IEEE 802.11 to transmit and receive. The HE access point 102 may be a base station. The HE access point 102 may use other communications protocols as well as the IEEE 802.11 protocol. The IEEE 802.11 protocol may be IEEE 802.11 a/b/g/n/ac/ad/af/ah/aj/ay/ax. The IEEE 802.11 protocol may include using one or more of multiple-input multiple-output (MIMO), orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA), multiple-user multiple-input multiple-output (MU-MIMO), and/or ODFMA or combination of MU-MIMO+OFDMA. There may be more than one HE access point 102 that is part of an extended service set (ESS). A controller (not illustrated) may store information that is common to the more than one HE access points 102. In some embodiments, a HE station 104 is configured to perform UL and DL MU transmission and reception.

The legacy devices 106 may operate in accordance with one or more of IEEE 802.11 a/b/g/n/ac/ad/af/ah/aj/ay, or another wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The HE access point 102 may communicate with legacy devices 106 in accordance with legacy IEEE 802.11 communication techniques. In example embodiments, the HE access point 102 may also be configured to communicate with HE STAs 104 in accordance with legacy IEEE 802.11 communication techniques.

In some embodiments, a HE frame may be configurable to have the same bandwidth as a channel. The HE frame may be a PPDU. In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE access point 102, HE STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE access point 102 may operate as a HE access point which may be arranged to contend for a wireless medium (e.g., during a contention period) to receive exclusive control of the medium for an HE control period. In some embodiments, the HE control period may be termed a transmission opportunity (TXOP). The FIE access point 102 may transmit a HE master-sync transmission, which may be a trigger frame or HE control and schedule transmission, at the beginning of the HE control period. The HE access point 102 may transmit a time duration of the TXOP and sub-channel information. During the HE control period, HE STAs 104 may communicate with the HE access point 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the HE access point 102 may communicate with HE stations 104 using one or more HE frames. During the HE control period, the HE STAs 104 may operate on a sub-channel smaller than the operating range of the HE access point 102. During the HE control period, legacy stations refrain from communicating. The legacy stations may need to receive the communication from the HE access point 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE access point 102 may also communicate with legacy stations 106 and/or HE stations 104 in accordance with legacy IEEE 802.11 communication techniques. In some embodiments, the HE access point 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a HE access point 102.

In some embodiments, the HE station 104 and/or HE access point 102 may be configured to operate in accordance with IEEE 802.11 mc or IEEE 802.11REVmd. A HE station 104 and/or HE access point 102 may be termed an HE device (e.g., station or AP), if the HE device complies with a wireless communication standard IEEE 802.11ax.

In example embodiments, the HE station 104 and/or the HE access point 102 are configured to perform the methods and functions described herein in conjunction with FIGS. 1-13.

Figure 2:
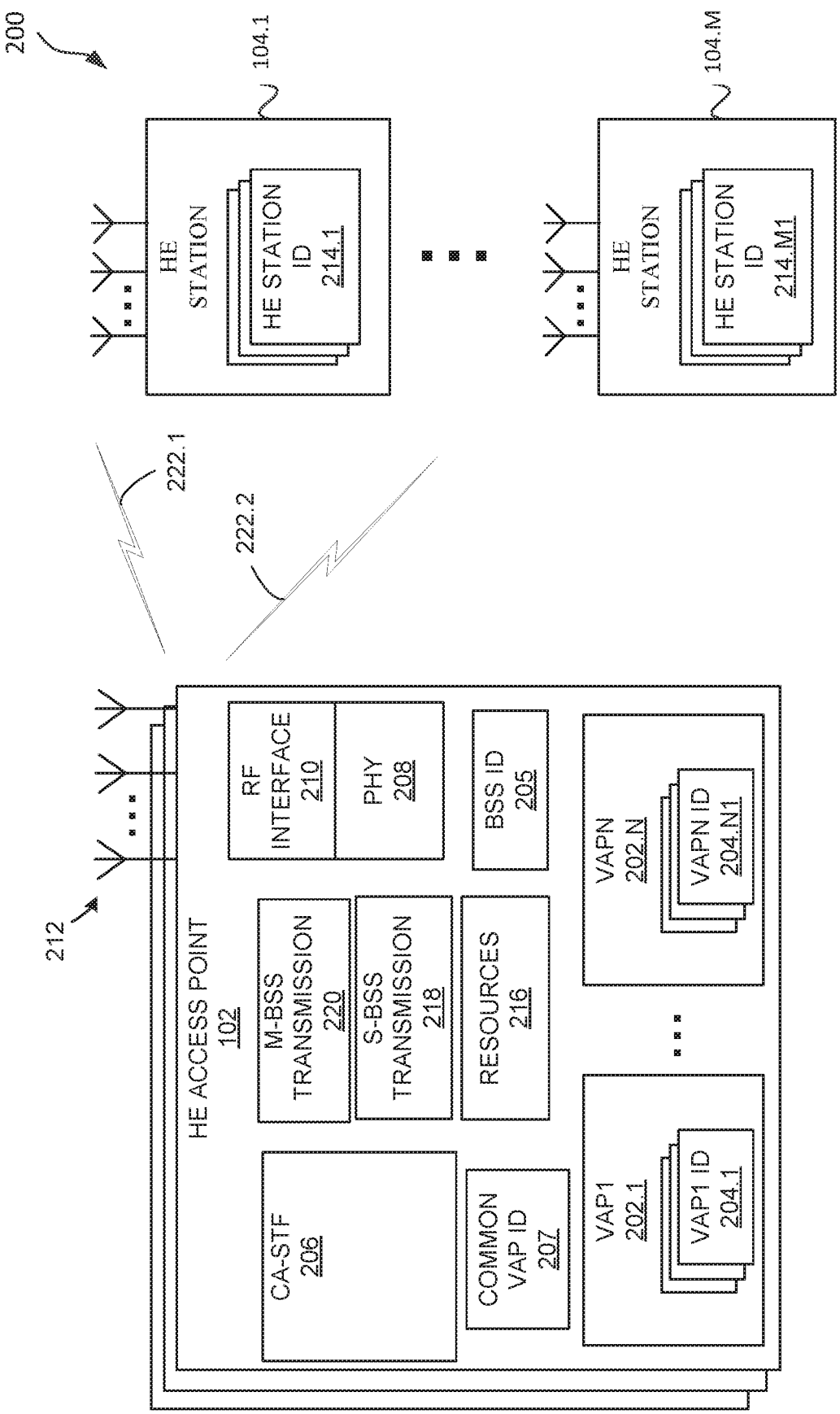
FIG. 2 illustrates a system for coordinated transmission among VAPS in accordance with some embodiments.

FIG. 2 illustrates a system 200 for coordinated transmission among VAPS 202 in accordance with some embodiments. Illustrated in FIG. 2 is HE stations 104, HE access point 102, and transmissions 222. The transmissions 222 may be transmissions between the VAPs 202 and the HE stations 104 and/or transmissions between the HE access point 102 and the HE stations 104.

A HE station 102 includes one or more HE station identifications (IDs) 214, in accordance with some embodiments. The HE station ID 214 may include a media access control (MAC) address of the HE station 102. The HE station ID 214 may be an association ID (AID) assigned to the HE station 102 when the HE station 104 associated with a VAP 202 and/or HE access point 104. In some embodiments, the HE station ID 214 may be a multi-BSS identification (M-ID). The M-ID may be assigned by the HE access point 102 and/or VAP 202. The M-ID may be a unique ID of the HE station 104 for the HE access point 102 and/or VAPs 202. In some embodiments, the HE station IDs 214 may include a BSS color. In some embodiments, two or more of the RE station IDs 214 may be used to identify the HE station 104, e.g., a BSS color and AID. In some embodiments, the CA-STF 206 may divide AIDs among the VAPs 204 so that an AID may indicate which VAP 202 the HE station 104 is associated with.

The HE access point 102 includes physical (PHY) 208, RF interface 210, antenna 212, VAPs 202, Channel Access and Simultaneous Transmission opportunity Function (CA-STF) 206, multiple-BSS (M-BSS) transmission 220, single-BSS (S-BSS) transmission 218, BSS ID 205, common VAP ID 207, and resources 216. The RF interface 210 may be an interface to the antennas 212. The PHY 208 may be a PHY layer that receives PHY service data units (PSDU) and encodes them for transmission over the antenna 220 via the RF interface 210.

In some embodiments, the PHY 208 is shared by the VAPs 202. The CA-STF 206 may receive information (e.g., PHY service data unit, PSDU), which may be aggregated information, via 216 from the VAPs 202 and determine what information (an aggregated PSDU) to send via 218 to the PHY 208. In some embodiments, the CA-STF 206 may determine resources 216 for a M-BSS transmission 220, and send the determined resources 216 to two or more VAPs 204, which may then encode based on the determined resources 216 one or more PSDUs and send the PSDUs back to the CA-STE 206 for transmission in the M-BSS transmission 220.

The radio frequency (RF) interface 210 may interface between the PRY 208 and the antennas 212 and may be used by the PRY 208 to operate the antennas 212.

The VAPs 202 may reside in a HE access point 102. The VAPs 202 may include one or more VAP IDs 204. In some embodiments, the VAPs 202 are logical entities that reside within the HE access point 102. The VAPs 202 may service HE stations 104. In some embodiments, the VAPs 202 share the PHY 208 via the CA-STF 206. The VAPs 202 may service different HE stations 104 in accordance with different encryption types. A VAP 202 may be termed an M-BSS, in accordance with some embodiments. The VAP ID 204 may be a BSS ID (BSSID) or MAC address of the VAP 202. The VAPs 202 may use the VAP ID 204 for a transmitter address. The VAP ID 204 may be a service set ID (SSID). The VAP ID 204 may be a multiple-BSSID (M-BSS ID) or a common VAP ID 207, in accordance with some embodiments. The VAP ID 204 may include a BSS color. A VAP 202 may be identified by one or more of the VAP IDs 204, e.g., a BSSID and a BSS color may identify the VAP 202 and, in some embodiments be termed a multi-BSSID (M-BSSID), which may be used to identify the VAP 202 among the different VAPs 202. One or more VAPs 202 may be identified by a common VAP ID 207. In some embodiments, the VAP ID 204 is associated with a service provided by the VAP 202. In some embodiments, a group of VAPs 202 share a VAP group ID (not illustrated) that may be used to address the group of VAPs 202. The VAP group ID may be a MAC address. Each VAP 202 may separately contend for the wireless medium. For example, each VAP 202 may maintain their own network allocation vectors (AAVs) and may perform a clear channel assessment (CCA) and wait a backoff period, e.g., in accordance with distributed channel access (DCF). If the CCA is idle for a predetermined period, or a backoff counter has gone to zero with a CCA idle, then the VAP 202 may have gained access to the wireless medium. The CA-STF 206 may determine whether the VAP 202 may have exclusive use of the wireless medium or whether the wireless medium is to be shared with other VAPs 202. The CCA may be performed using the CA-STF 206, which may be configured to control the antenna 212 and report the results of CCA to one or more of the VAPs 202. In some embodiments, the VAPs 202 will access the wireless medium in accordance with a point coordination function (PCF), where the CA-STF 206 manages which VAP 202 or VAPs 202 accesses the wireless medium.

If more than one VAP 202 gains access to the wireless medium, then the CA-STF 206 may determine which VAPs 202 will have access to the wireless medium and whether the transmission will be a M-BSS transmission 220 or a S-BSS transmission 218. The VAPs 202 may send to the CA-STF 206.

Figure 4:
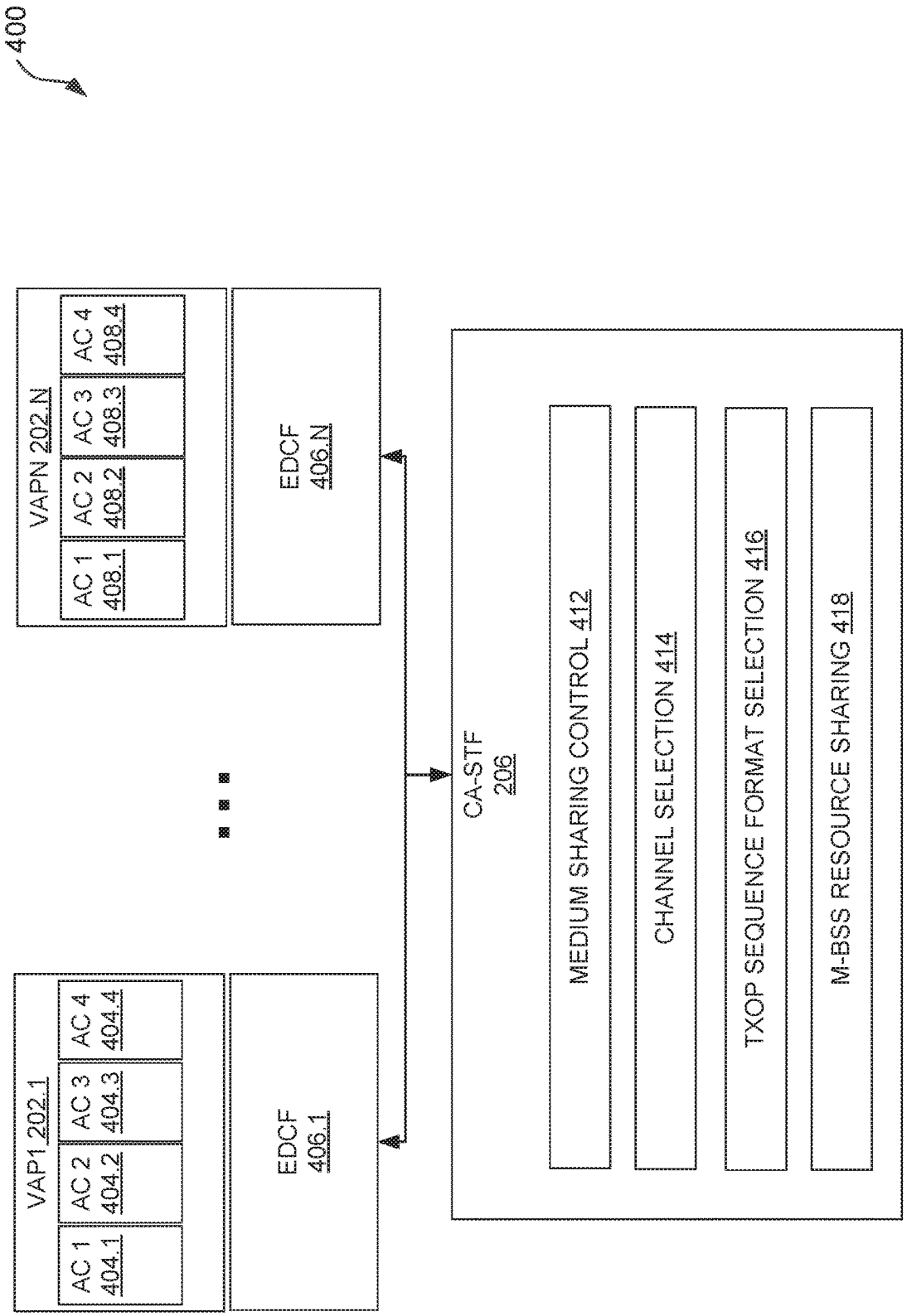
FIG. 4 illustrates a system for coordinated transmissions among VAPs in accordance with some embodiments.

In some embodiments, the VAPs 202 are configured to use enhanced distributed channel access (EDCA), e.g., see FIG. 4 where each VAP 202 has their own EDCF 406. In some embodiments, the VAPs 202 share an EDCA managed by the CA-STF 206, e.g., see FIG. 5, EDCF DL/UL 502.

The CA-STF 206 manages the PHY 208 resource by determining resource allocations among the VAPs 204. The CA-STF 206 may determine which VAP 202 to send information (e.g., PSDUs) from the PHY 208 to.

The CA-STF 206 may encode trigger frames (TFs) from information from the VAPs 202. In some embodiments, if a TF (e.g., TF 510) includes recipient HE stations 104 that are associated with two different VAPs 202 (e.g., two different VAP IDs 204 such as two different BSSIDs), then the transmitter address (TA) of the TF is set to a common address. In some embodiments, if all the recipient HE stations 104 are associated with the same VAP 204, then a VAP ID 206 of the VAP 204 is used, e.g., a BSSID of the VAP 204.

In some embodiments, the CA-SFT 206 is configured to coordinate MU transmissions, e.g., 222, to the HE stations 104 from the VAPs 202 and from the HE stations 104 to the VAPs 202, e.g., the CA-SFT 206 may receive PSDUs from the PHY 208 and send them via 216 to the VAPs 202, or the CA-STF 206 may receive PSDUs from the VAPs 202 and combine them and send them to the PHY 208 for a MU transmission, e.g., transmission 222.

The CA-SFT 206 may be configured to optimize or improve resource utilization such as throughput (e.g., reduce collisions among VAPs 202, reduce PPDU restrictions, and acknowledgment overheads), reduce latency (e.g., enable VAPs 202 to transmit simultaneously, power coordination (e.g., enable commonly scheduled VAPs 202 to coordinate transmit power, TXP, and received signal strength indicator, RSSI, for HE stations 104), and reduce system load, e.g., reduce VAP 202 collisions since collisions may be resolved internally.

The CA-SFT 206 may be configured to monitor channel access for each of the VAPs 202. For example, the CA-SFT 206 may monitor the EDCFs 306 (FIG. 3) of the VAPs 202 and when an EDCF 306 determines a M-BSS transmission opportunity (M-BSS-TO) is gained (e.g., a clear channel assessment, CCA, is idle for a period, or a backoff counter has gone to zero with a CCA idle), then the CA-SFT 206 may determine how to allocate resources 216 for the VAPs 202, e.g. a M-BSS transmission 220 or S-BSS transmission 218.

Figure 6:
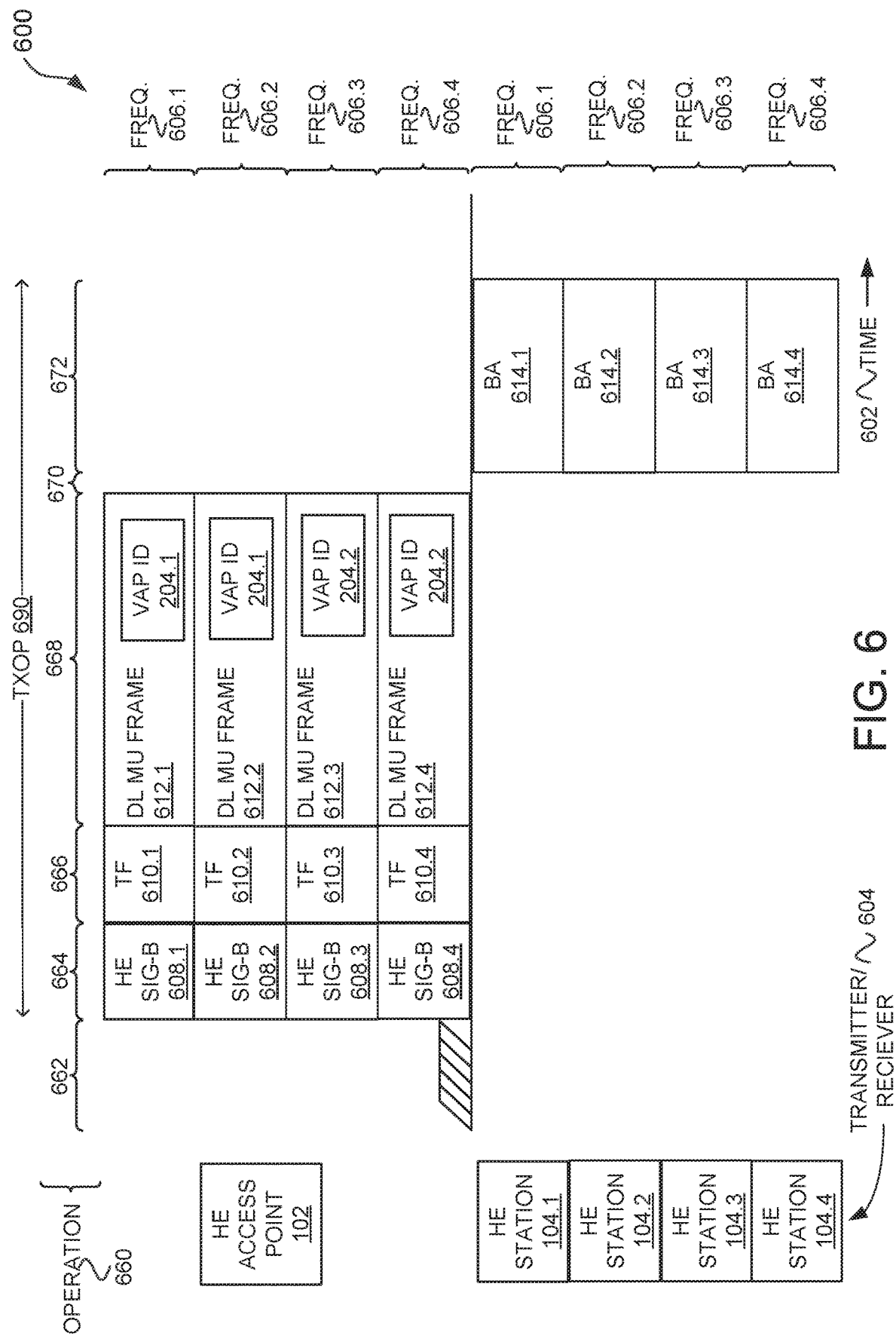
FIG. 6 illustrates a method for coordinated transmissions among VAPs in accordance with some embodiments.
Figure 7:
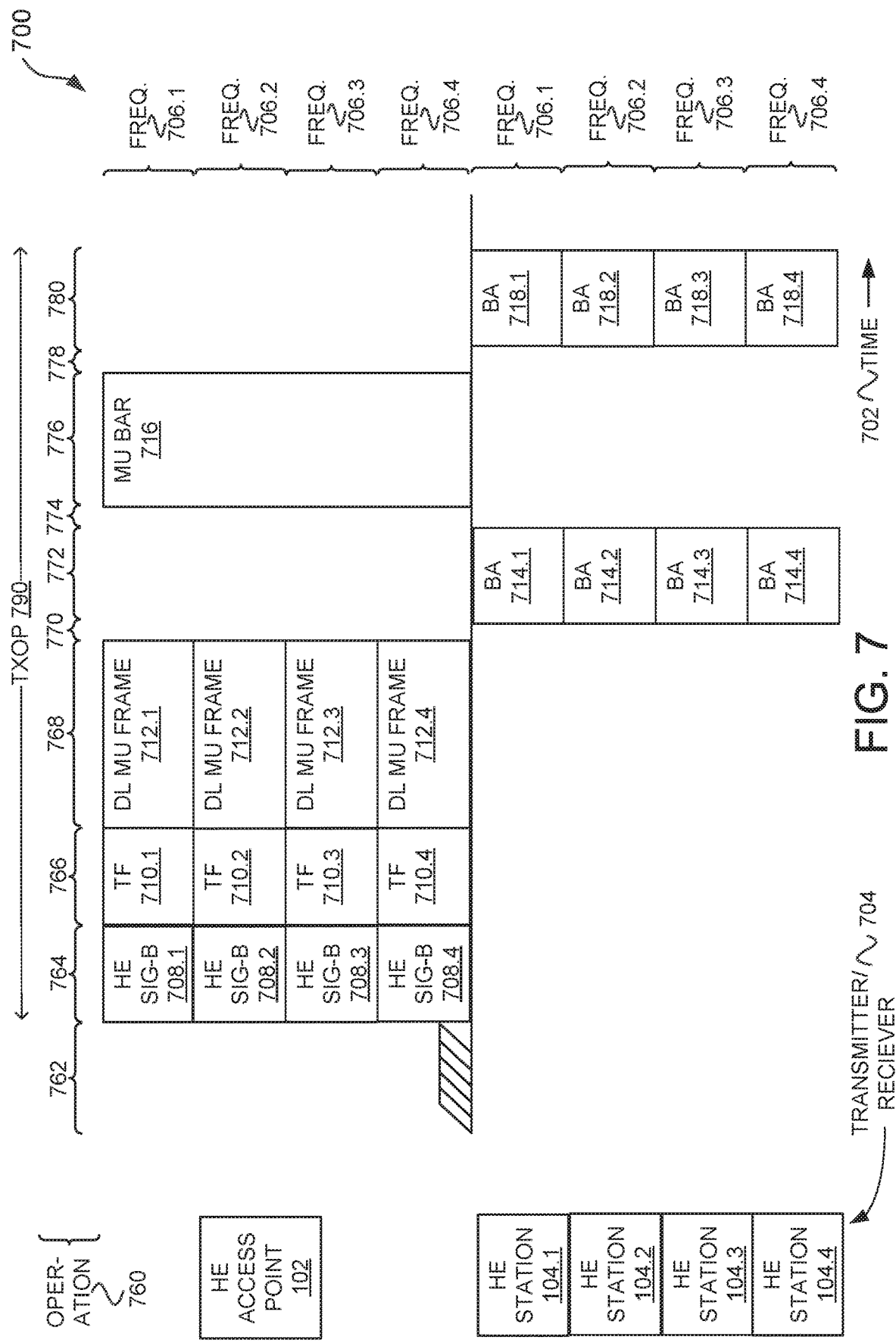
FIG. 7 illustrates a method for coordinated transmissions among VAPs in accordance with some embodiments.
Figure 8:
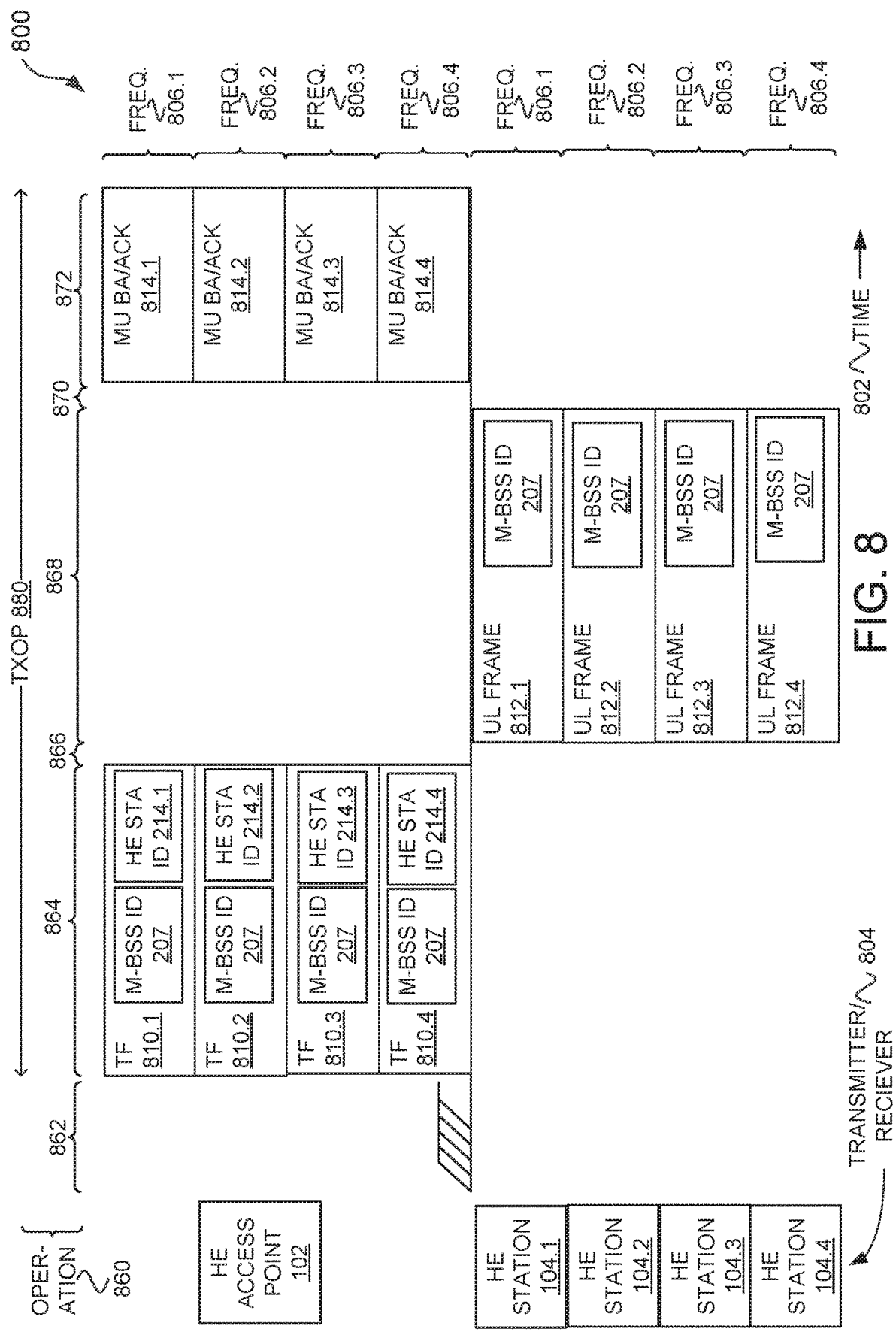
FIG. 8 illustrates a method for coordinated transmissions among VAPs in accordance with some embodiments.

In some embodiments, the M-BSS transmission 220 is a transmission with more than one VAP 202, e.g., see FIGS. 6-8. In some embodiments, the M-BSS transmission 220 is a received transmission (e.g., communication intended for more than one VAP 202. The M-BSS transmission 220 may indicate a TXOP. In some embodiments, the M-BSS 220 is multiple packets or frames. The S-BSS transmission 218 indicates a single VAP 202 will use the wireless medium. The S-BSS transmission 218 may be a received transmission where only one VAP 202 is indicated. In some embodiments, the S-BSS transmission 218 is a TXOP. In some embodiments, the S-BSS transmission 218 is multiple packets or frames.

The BSS ID 205 may be an address of the HE access point 102. In some embodiments, the BSS ID 205 is used in M-BSS transmission 220. In some embodiments, the HE access point 102 acts independently of the VAPs 202. The resources 216 may be as described in conjunction with FIG. 3. The common VAP ID 207 may be used for M-BSS transmissions 220 when more than one VAP 202 is sending or receiving packets. In some embodiments, the common VAP ID 207 is a common ID of at least two VAPs 202 (e.g., a BSSID), and is a VAP MAC level ID or a physical (PHY) level ID of the access point (e.g., a color).

Figure 3:
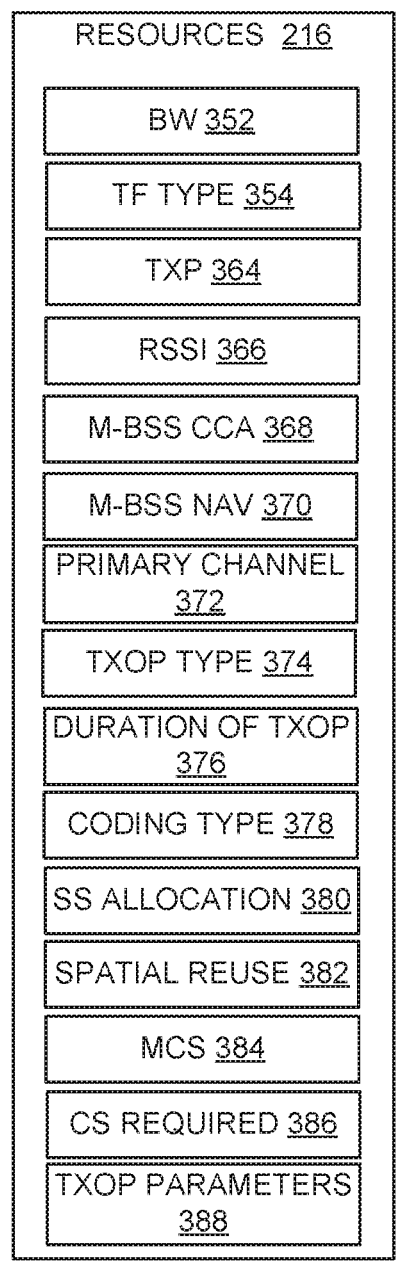
FIG. 3 illustrates resources in accordance with some embodiments.

FIG. 3 illustrates resources 216 in accordance with some embodiments. The resource 216 may include bandwidth (BW) 352, TF type 354, TXP 364, receive signal strength indicator (RSSI) 366, M-BSS CCA 368, M-BSS NAV 370, primary channel 372, TXOP type 374, duration of TXOP 376, coding type 378, SS allocation 380, spatial reuse 382, modulation, coding scheme (MCS) 384, carrier sense (CS) required 386, and TXOP parameters 388.

The BW 352 may indicate the BW for the transmission, e.g., 20 MHz, 40 MHz, 80 MHz, 80 MHz+80 MHz, 160 MHz, or a different BW.

The TF type 354 may be a basic trigger, beamforming report poll, MU-block acknowledgment request (MU-BAR), MU-request-to-send (MU-RTS), buffer status report poll (BSRP), or another type of TF.

The TXP 364 may be the TXP used to transmit one or more frames of the M-BSS transmission 220 or S-BSS transmission 218. The CA-STF 206 may be configured to determine the TXP 364 based on information from the VAPs 202, e.g., the CA-STF 206 may pick an intermediate value of two values sent to the CA-STF 206 from two VAPs 202. The information from the VAPs 202 may include regulatory constraints on the TXP 364 and co-located wireless communication standards such as BlueTooth®.

The RSSI 366 may indicate a target power at the HE access point 102 for the HE stations 104. The CA-STF 206 may be configured to determine the TXP 364 based on information from the VAPs 202, e.g., the CA-STF 206 may pick an intermediate value of two values sent to the CA-STF 206 from two VAPs 202.

The CS required 386 may indicate whether HE stations 104 are to perform a CCA before transmitting in response to a trigger frame (e.g., M-BSS transmission 220).

The CA-STF 206 may determine a common M-BSS CCA 368 (e.g., energy detect levels or PHY header, 802.11 transmission) for the VAPs 202 to use. The CA-STF 206 may receive information from the VAPs 202 regarding CCA values the VAPs 202 may need to use or recommend to use.

The CA-STF 206 may determine M-BSS NAV 370 (e.g., spatial reuse, energy detect levels, etc.) for the VAPs 202 to use. The CA-STF 206 may receive information from the VAPs 202 regarding NAV parameters the VAPs 202 may need to use or recommend to use.

The CA-STF 206 may determine one or more primary channels 372 (e.g., which channels to use as primary channels, which may be one per VAP 202 and which may overlap or be the same channel) for the VAPs 202 to use. The CA-STF 206 may receive information from the VAPs 202 regarding primary channel 372 parameters the VAPs 202 may need to use or recommend to use. The primary channel 372 may be a channel the VAPs 202 use as a primary channel as described in IEEE 802.11, in accordance with some embodiments.

The CA-STF 206 may determine TXOP type 374, duration of TXOP 376, coding type 378, SS allocation 380, spatial reuse 382, MCS 384, CS required 386, etc., (e.g., the PPDUs to be transmitted in a TXOP, see FIGS. 6-8) to use for M-BSS transmission 220 and/or S-BSS transmission. The CA-STF 206 may receive information from the VAPs 202 regarding the resource 216 such as data to send/receive, HE stations 104 availability, channel quality, etc. The CA-STF 206 may determine the resource 216 to use for a TXOP, e.g., M-BSS TO, based on the information received from the VAPs 202.

The TXOP parameters 388 may be one or more parameters used for M-BSS transmission 220 and/or S-BSS transmission, e.g., TXOP type 374, another resource 216, etc. The TXOP parameters 388 may be determined by CA-STF 206.

FIG. 4 illustrates a system for coordinated transmissions among VAPs in accordance with some embodiments. Illustrated in FIG. 4 is VAP1 202.1 through VAPN 202.N and CA-STF 206. The VAPs 202 include access categories (AC)s 404, 408 and EDCFs 406. In some embodiments, the ACs 404, 408 are AC for an EDCF 406. Each AC 404, 408 has pre-determined values for a set of access parameters to the wireless medium that statistically prioritize the different ACs. AC 4 404.4, for example, may be an AC for voice. The ACs 404, 408 may have input and output queues (not illustrated) for data to be received from the HE stations 104 and data to be transmitted to the HE stations 104.

In some embodiments, the EDCFs 406 contend for the wireless medium in accordance with the parameters for each ACs 404, 408 (e.g., contention window, arbitration interframe space, AIFS, etc.) that have data. The EDCFs 406 may maintain NAVs as well. The EDCF 406 may determine that access to the wireless medium has been gained when the NAVs indicate the medium is clear and when the physical medium indicates the medium is clear. The EDCFs 406 may notify the CA-STF 206 when one or more of their ACs 404, 408 have gained access to the wireless medium.

The CA-STF 206 includes medium sharing control 412, channel selection 414, TXOP sequence format selection 416, and M-BSS resource sharing 418. The CA-STF 206 may receive indications that one or more of the VAPs 202 has gained control of the wireless medium, and then the medium sharing control 412 may determine which of the VAPs 202 to give access to the wireless medium.

The channel selection 414 may determine resources 216 for channel selections, e.g., CCA, NAV, primary channel, etc. The CA-STF 206 may receive information regarding resource 216 related to channel selection, and the CA-STF 206 may then determine the resources 216 related to channel selection.

The TXOP sequence format selection 416 may select resources 216 for a TXOP sequence. For example, PPDUs, M-BSS protection PPDUs, PPDU sounding, OFDMA, random access, HE STA 104 availability, data pending to be transmitted or received, etc.

The M-BSS resource sharing 418 may determine how to share resources of a TXOP among the VAPs 202. For example, how many RUs to assign to a particular VAP 202, where to assign any RUs to a VAP 202, etc.

Figure 5:
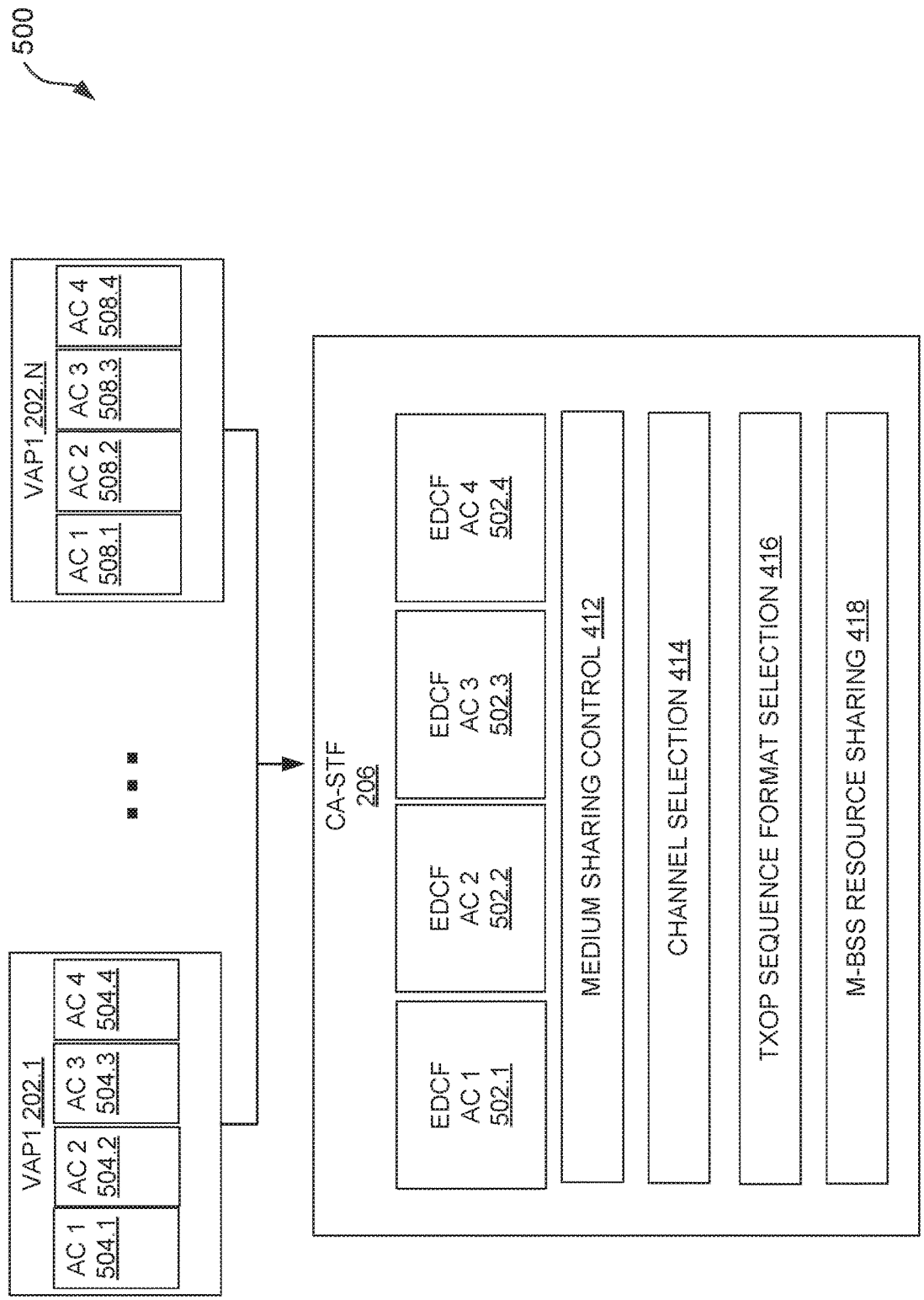
FIG. 5 illustrates a system for coordinated transmissions among VAIN in accordance with some embodiments.

FIG. 5 illustrates a system 500 for coordinated transmissions among VAPs 202 in accordance with some embodiments. Illustrated in FIG. 4 is VAP1 202.1 through VAPN 202.N and CA-STF 206. The VAPs 202 include ACs 504, 508. In some embodiments, the ACs 504, 508 are ACs for an EDCF 502. Each AC 504, 508 has pre-determined values for a set of access parameters to the wireless medium that statistically prioritize the different ACs. AC 5 404.4, for example, may be an AC for voice. The ACs 504, 508 may have input and output queues (not illustrated) for data to be received from the HE stations 104 and data to be transmitted to the HE stations 104.

The CA-STF 206 may include EDCF AC 1 502.1, EDCF AC 2 502.2, EDCF AC 3 502.3, and EDCF AC 4 502.4. Each EDCF 502 may service the ACs 504, 508 of the VAPs 202. The EDCFs 502 may monitor the ACs 504 of the VAPs 202 and contend for the wireless medium in accordance with the AC. The EDCFs 502 may send an indication of gaining access to the medium sharing control 412, for example, which may determine which VAPs 202 to give access to the wireless medium. The CA-STF 206 may be configured to determine a M-BSS transmission 220 and/or S-BSS transmission 218 based on the resources 216 and which EDCFs 502 gained control of the wireless medium and for which VAPs 202.

FIG. 6 illustrates a method 600 for coordinated transmissions among VAPs 202 in accordance with some embodiments. Illustrated in FIG. 6 is time 602 along a horizontal axis, transmitter/receiver 604 along a vertical axis, frequency 606 along a vertical axis on the right, and operations 660 along the top.

The frequency 606 may be a channel, e.g. less than 20 MHz, 20 MHz, 40 MHz, 80 MHz, 160 MHz, 320 MHz, or another bandwidth. The frequencies 606 may indicate an RU. The frequencies 606 may overlap. For example, two HE stations 104 may be allocated the same frequencies 606 for MU-MIMO or a HE station 104 may use the same frequency 606 for a BA 614 as the HE access point 102 uses for TF 610. As illustrated the frequency 606 is repeated twice once for the HE stations 104 and once for the HE access point 102.

The TXOP 690 is an M-BSS transmission 220. The M-BSS transmission 220 is a downlink (DL) M-BSS with an immediate ack. In accordance with some embodiments, the CA-STF 206 determine the TXOP 690 duration and the type of transmissions.

The method 600 begins at operation 662 with the HE access point 102 gaining access to the wireless medium. For example, one or more VAPs 202 may gain access to the wireless medium and indicate to the CA-STF 206 that they gained access to the wireless medium (or the CA-STF 206 may monitor access to the wireless medium).

For example, VAP 202.1 and VAP 202.2 may have gained access to the wireless medium. VAP 202.1 may have DL data for HE station 104.1 and HE station 104.2, and VAP 202.2 may have DL data for HE station 104.3 and HE station 104.4. The CA-STF 206 may determine to encode an M-BSS transmission 220. The CA-STF 206 may receive resources 216 information from VAP 202.1 and VAP 202.2 and determine the resources 216 to use for the M-BSS transmission 220.

The method 600 continues at operation 664 with the HE access point 102 transmitting HE SIG-B 608. The HE SIG-B 608 may include a resource allocation indication for the HE stations 104 that indicates which HE station 104 is to receive the corresponding DL MU frame 612. For example, HE-SIG-B 608.1 may indicate that DL MU FRAME 612 is for HE station 104.1, HE SIG-B 608.2 may indicate DL MU frame 612.2 is for HE station 104.2, HE SIG-B 608.3 may indicate DL MU frame 612.3 is for HE station 104.3, and HE SIG-B 608.4 may indicate DL MU frame 612.4 is for HE station 104.4.

Optionally, the method 600 may continue at operation 666 with the HE access point 102 transmitting TFs 610. In some embodiments, the TFs 610 are in accordance with the TF 1000 as disclosed in conjunction with FIG. 10. In some embodiments, the HE access point 102 does not transmit the TFs 610. The method 600 continues at operation 668 with the HE access point 102 transmitting DL MU frames 612. The DL MU frames 612 may include data in accordance with the resource allocation in the HE SIG-Bs 608, The DL MU frame 612 may include the VAP ID 204 of the VAP 202 that is sending the DL MU frame 612 to the corresponding HE station 104. The DL MU frame 612 may include a HE station ID 214 as a receiver address.

The method 600 continues at operation 670 with the HE stations 104 waiting a period of time before transmitting. The period of time may be a short interframe space (SIFS) time or another period of time.

The method 600 continues at operation 672 with the HE stations 104 transmitting BAs 614. The BAs 614 may be in acknowledgement to the DL MU frames 612. The BA 614 may include a HE station ID 214 as a transmitter address and a common VAP ID 207 or VAP ID 204 as a receiver address as described in accordance with FIG. 2.

FIG. 7 illustrates a method 700 for coordinated transmissions among VAPs 202 in accordance with some embodiments. Illustrated in FIG. 7 is time 702 along a horizontal axis, transmitter/receiver 704 along a vertical axis, frequency 706 along a vertical axis, and operations 760 along the top.

The frequency 706 may be a channel, e.g. less than 20 MHz, 20 MHz, 40 MHz, 80 MHz, 160 MHz, 320 MHz, or another bandwidth. The frequencies 706 may indicate an RU. The frequencies 706 may overlap. For example, two HE stations 104 may be allocated the same frequencies 706 for MU-MIMO or a HE station 104 may use the same frequency 706 for a BA 714 as the HE access point 102 uses for TF 710. As illustrated the frequency 706 is repeated twice once for the HE stations 104 and once for the HE access point 102.

The TXOP 790 is an M-BSS transmission 220. The M-BSS transmission 220 is a downlink (DL) M-BSS with an immediate acknowledgement and a delayed acknowledgement. In accordance with some embodiments, the CA-STF 206 determine the TXOP 790 duration and the type of transmissions.

The method 700 begins at operation 762 with the HE access point 102 gaining access to the wireless medium. For example, one or more VAPs 202 may gain access to the wireless medium and indicate to the CA-STF 206 that they gained access to the wireless medium (or the CA-STF 206 may monitor access to the wireless medium).

For example, VAP 202.1 and VAP 202.4 may have gained access to the wireless medium. VAP 202.1 may have DL data for HE station 104.1 and HE station 104.2, and VAP 202.4 may have DL data for HE station 104.3 and HE station 104.4. The CA-STF 206 may determine to encode an M-BSS transmission 220. The CA-STF 206 may receive resources 216 information from VAP 202.1 and VAP 202.2 and determine the resources 216 to use for the M-BSS transmission 220.

The method 700 continues at operation 764 with the HE access point 102 transmitting HE SIG-B 708. The HE SIG-B 708 may include a resource allocation indication for the HE stations 104 that indicates which HE station 104 is to receive the corresponding DL MU frame 712. For example, HE-SIG-B 708.1 may indicate that DL MU FRAME 712 is for HE station 104.1, HE SIG-B 708.2 may indicate DL MU frame 712.2 is for HE station 104.2, HE SIG-B 708.3 may indicate DL MU frame 712.3 is for HE station 104.3, and HE SIG-B 708.4 may indicate DL MU frame 712.4 is for HE station 104.4.

The method 700 may continue at operation 766 with the HE access point 102 transmitting TFs 710. In some embodiments, the TFs 710 are in accordance with the TF 1000 as disclosed in conjunction with FIG. 10. The method 700 continues at operation 768 with the HE access point 102 transmitting DL MU frames 712. The DL MU frames 712 may include data in accordance with the resource allocation in the HE SIG-Bs 708. The DL MU frames 712 may include a HE station ID 214 to identify which HE station 214 the DL MU frame 712 is for, and a common VAP ID 207 or VAP ID 204 as described in accordance with FIG. 2 to identify the VAP 202 the BA 714 is from.

The method 700 continues at operation 770 with the HE stations 104 waiting a period of time before transmitting. The period of time may be a SIFS time or another period of time.

The method 700 continues at operation 772 with the HE stations 104 transmitting BAs 714. The BAs 714 may be in acknowledgement to the DL MU frames 712. The BA 714 may include a HE station ID 214 as a transmitter address and a common VAP ID 207 or VAP ID 204 as described in accordance with FIG. 2 to identify the VAP 202 the BA 714 is for.

The method 700 continues at operation 774 with the HE access point 102 waiting a period of time before transmitting. The period of time may be a SIFS time or another period of time.

The method 700 continues at operation 776 with the HE access point 102 transmitting MU BA request (BAR) 714. The MU BAR 716 may be a frame to solicit BAs 718 from the HE stations 104. The MU BAR 716 may include resource allocation for the HE stations 104 to transmit the BAs 718. The MU BAR 714 may include a HE station ID 214 to identify the HE stations 104 that are to transmit BAs 718, and a common VAP ID 207 or VAP ID 204 as described in accordance with FIG. 2 to identify the VAP 202 the MU BAR 716 is from.

The method 700 continues at operation 778 with the HE stations 104 waiting a period of time before transmitting. The period of time may be a SIFS time or another period of time.

The method 700 continues at operation 780 with the HE stations 104 transmitting BAs 718. The BAs 718 may include a HE station ID 214 and a common VAP ID 207 or VAP ID 204 as described in accordance with FIG. 2.

The CA-STF 206 may be configured to use a common VAP ID 207 when an M-BSS transmission 220 is being encoded and a BSS ID 205 or VAP ID 204 when a S-BSS transmission 218 is being encoded.

The HE stations 104 may be configured to encode responses and identify receiver addresses as the HE station 104 with an association ID for S-BSS transmissions 218 and an HE station ID 214 if M-BSS transmission 220 is received, e.g., the HE station 104 may use a color and an association ID when an M-BSS transmission 220 is received.

FIG. 8 illustrates a method 800 for coordinated transmissions among VAPs 202 in accordance with some embodiments. Illustrated in FIG. 8 is time 802 along a horizontal axis, transmitter/receiver 704 along a vertical axis, frequency 706 along a vertical axis, and operation s 760 along the top. In some embodiments, TF 810 may be broadcast with a single element and per HE station 104 information, e.g., TF 810 may be a trigger frame 1000.

The frequency 806 may be a channel, e.g. less than 20 MHz, 20 MHz, 40 MHz, 80 MHz, 160 MHz, 320 MHz, or another bandwidth. The frequencies 806 may indicate an RU. The frequencies 806 may overlap. For example, two HE stations 104 may be allocated the same frequencies 806 for MU-MIMO or a HE station 104 may use the same frequency 806 for a BA 814 as the HE access point 102 uses for TF 810. As illustrated the frequency 806 is repeated twice once for the HE stations 104 and once for the HE access point 102.

The TXOP 890 is an M-BSS transmission 220. The M-BSS transmission 220 is a downlink (DL) M-BSS with an immediate acknowledgement and a delayed acknowledgement. In accordance with some embodiments, the CA-STF 206 determine the TXOP 890 duration and the type of transmissions.

The method 800 begins at operation 862 with the HE access point 102 gaining access to the wireless medium. For example, one or more VAPS 202 may gain access to the wireless medium and indicate to the CA-STF 206 that they gained access to the wireless medium (or the CA-STF 206 may monitor access to the wireless medium).

For example, VAP 202.1 and VAP 202.4 may have gained access to the wireless medium. VAP 202.1 may have DL data for HE station 104.1 and HE station 104.2, and VAP 202.4 may have DL data for HE station 104.3 and HE station 104.4. The CA-STF 206 may determine to encode an M-BSS transmission 220. The CA-STF 206 may receive resources 216 information from VAP 202.1 and VAP 202.2 and determine the resources 216 to use for the M-BSS transmission 220.

The method 800 continues at operation 864 with the HE access point 102 transmitting TF 810. The TF 810 may include a resource allocation indication for the HE stations 104 that indicates an UL resource allocation for each HE station 104. The TF 810 may be in accordance with the trigger frame 1000 disclosed in conjunction with FIG. 10. The TF 810 may include a HE station ID 214 as a receiver address HE station ID 214.1, 214.2, 214.3, 214.4) and a common VAP ID 207 or VAP ID 204 as described in accordance with FIG. 2 as the transmitter address.

The method 800 continues at operation 866 with the HE access point 102 waiting a period of time before transmitting. The period of time may be a SIFS time or another period of time.

The method 800 continues at operation 868 with the HE stations 104 transmitting UL frames 812 in accordance with the UL resource allocations indicated in the TF 810. The UL frames 812 may include common VAP ID 207 and data.

The method 800 continues at operation 870 with the HE access point 102 waiting a period of time before transmitting. The period of time may be a SIFS time or another period of time. The method 800 continues at operation 872 with the HE access point 102 transmitting MU BAs 814. The MU-BAs 814 may be in acknowledgement to the UL MU frames 812. The MU-BA 814 may include a HE station ID 214 as a receiver address and a common VAP ID 207 or VAP ID 204 as described in accordance with FIG. 2 as the transmitter address.

The CA-STF 206 may be configured to use a common VAP ID 207 when an M-BSS transmission 220 is being encoded and a BSS ID 205 or VAP ID 204 when a S-BSS transmission 218 is being encoded. The HE stations 104 may be configured to encode responses and identify receiver addresses as the HE station 104 with an association ID for S-BSS transmissions 218 and an HE station ID 214 if M-BSS transmission 220 is received, e.g., the HE station 104 may use a color and an association ID when an M-BSS transmission 220 is received.

Figure 9:
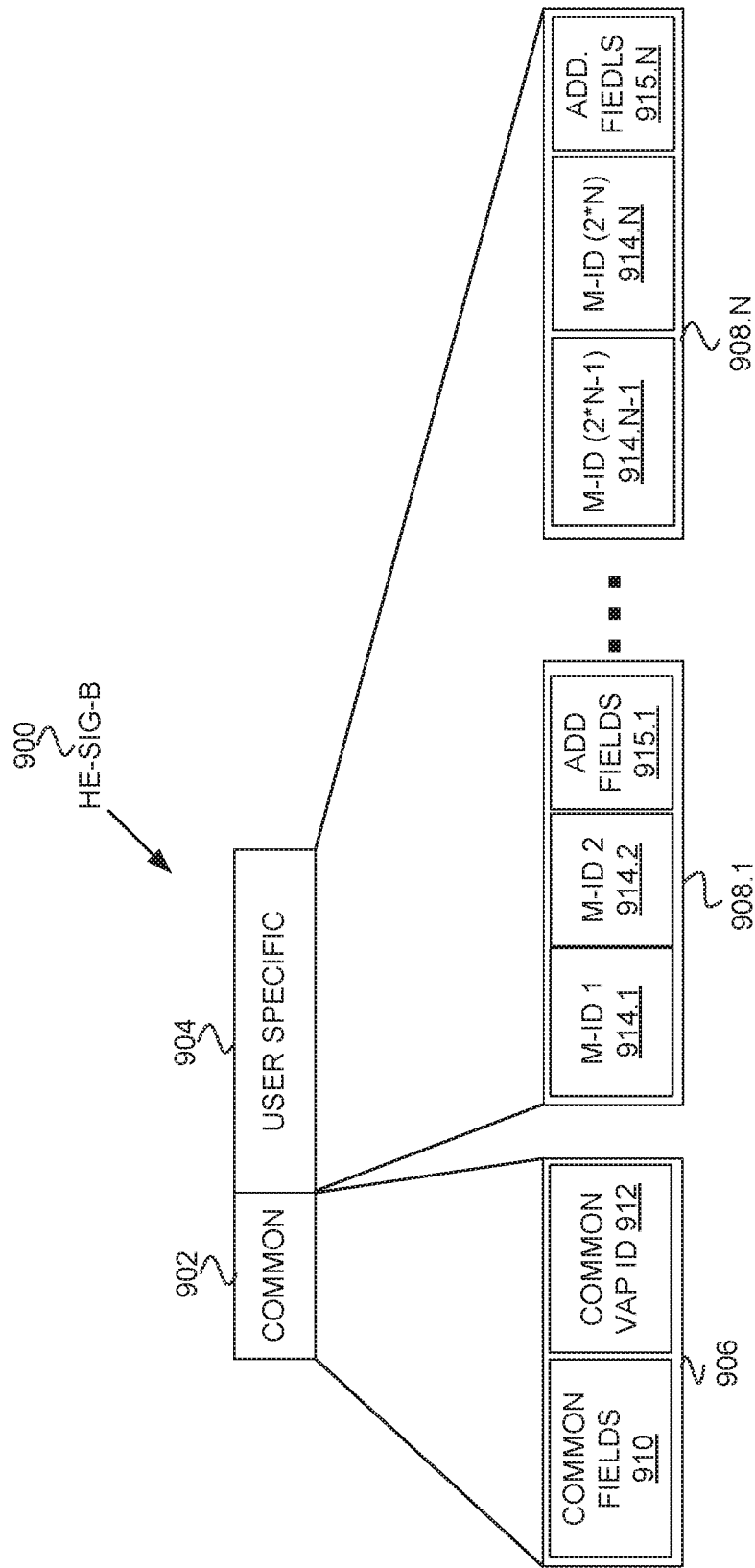
FIG. 9 illustrates a HE signal (SIG) B field in accordance with some embodiments.

FIG. 9 illustrates a HE signal (SIG) B field 900 in accordance with some embodiments. Illustrated in FIG. 9 is HE-SIG-B 900 which may include a common 902 portion and a user specific 904 portion. The common 902 portion may include common fields 910 and a common VAP ID 912. The common fields 910 may include fields to indicate how to decode the PPDU, e.g., TF 610 and DL MU frame 612, e.g., the common fields may be one or more of the resources

216, e.g. a TF type 354. The a common VAP ID 912 may be an ID for one or more VAPs 204 as described in conjunction with FIG. 2.

Figure 10:
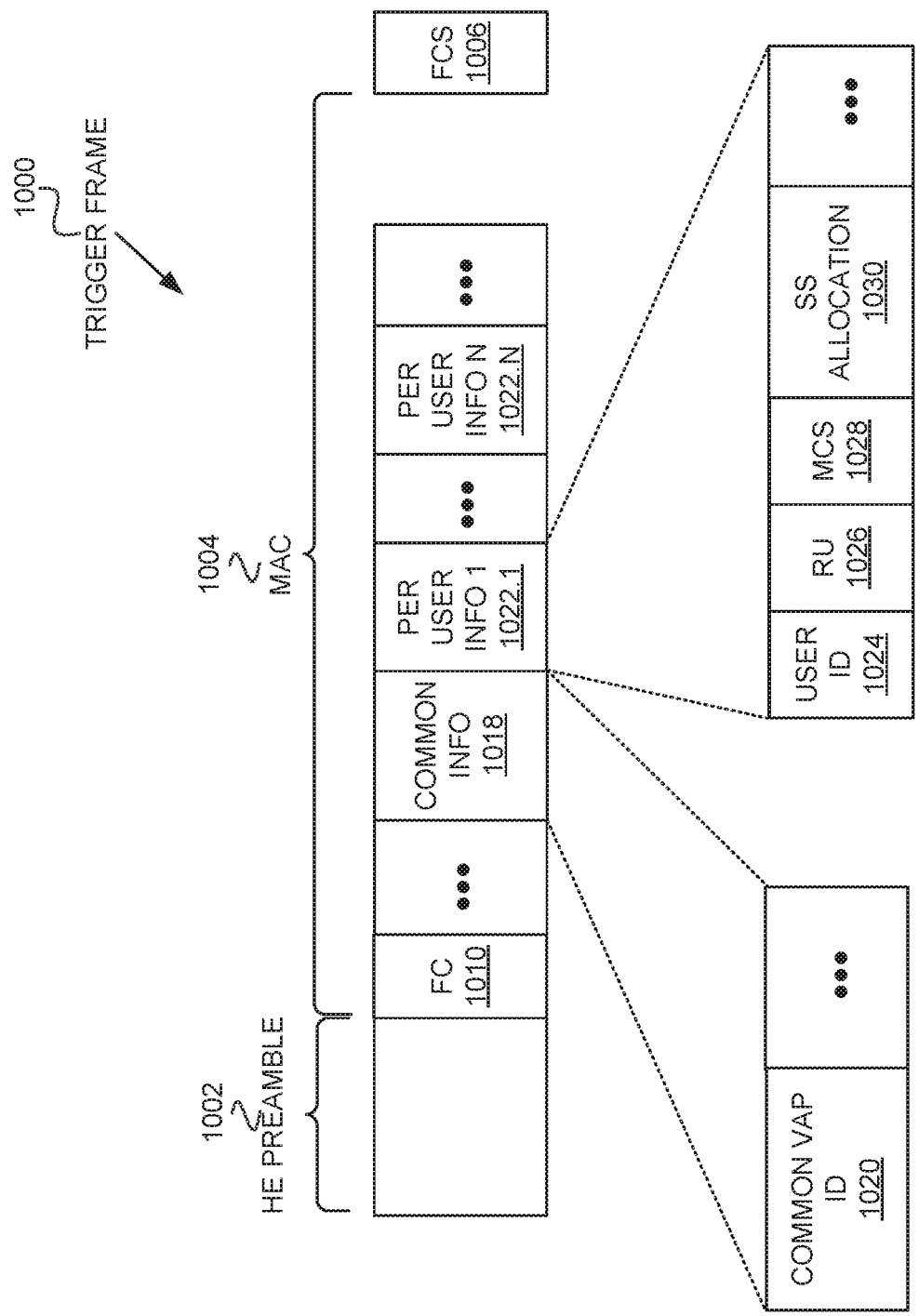
FIG. 10 illustrates a trigger frame in accordance with some embodiments.

The user specification 904 portion may comprise N two ID portions 908.1 through 908.N. Each two ID portion 908 may include two user or HE station 104 IDs and additional (add) fields 915. The additional fields 915 may include one or more of the resources 216, e.g., MCS 384. The two IDs, e.g., M-ID 1 914.1 and M-ID 2 914.2 may be HE station IDs 214 as disclosed in conjunction with FIG. 2, FIG. 10 illustrates a trigger frame 1000 in accordance with some embodiments. In some embodiments, the trigger frame 1000 includes HE preamble 1002, MAC 1004, and frame check sequence (FCS) 1006. The HE preamble 1002 may include a legacy portion and an HE portion (e.g., HE SIG-B 900). The MAC 1004 may include frame control (FC) 1010, common information 1018, and per user information 1 1022.1 through per user information N 1022.N. The FC 1010 may include information indicating the type of frame the trigger frame 1000 is, e.g., a protocol version, type of frame, etc.

The common information 1018 may include information that is common to the users or HE stations 104. For example, common information 1018 may include common VAP ID 1020, which may be VAP ID 204 as disclosed in conjunction with FIG. 2. The common information 1018 may include information for decoding the trigger frame 1000 or decoding subsequent frames. The common information 1018 may include information for encoding frames to the HE access point 102 or VAP 202 as well as information regarding the TXOP, e.g., what frames the HE stations 102 are to encode. The per user info 1022 may include user ID 1024, RU 1026, MCS 1028, SS allocation 1030, as well as other fields. The user ID 1024 may be a HE station 214 as disclosed in conjunction with FIG. 2. The FCS 1006 may provide error correction information. The common D 1020 may be a common VAP ID 207 as described in conjunction with FIG. 2.

Figure 11:
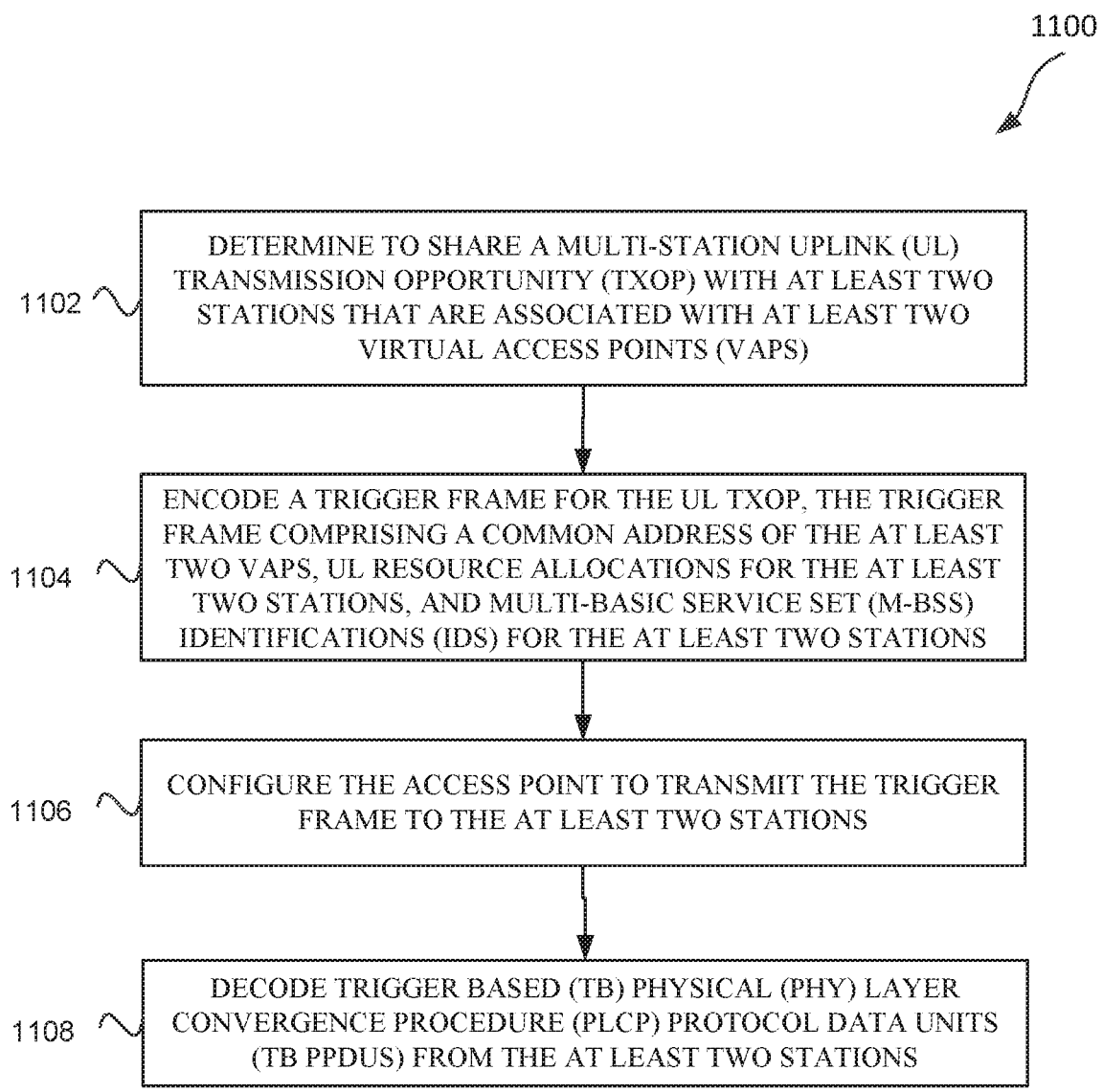
FIG. 11 illustrates a method for coordinated transmission among VAPs in accordance with some embodiments.

FIG. 11 illustrates a method 1100 for coordinated transmission among VAPs in accordance with some embodiments. The method 1100 begins at operation 1102 with determining to share a multi-station UL TXOP with at least two stations that are associated with at least two virtual access points (VAPs). For example, CA-STF 206 (FIG. 2) may determine to share a UL TXOP with HE stations 104.1 (FIG. 8) through HE stations 104.4 that are associated with VAP 202.1 and VAP 202.2.

The method 1100 continues at operation 1104 with encoding a trigger frame for the UL TXOP, the trigger frame including a common address of the at least two VAPs, UL resource allocations for the at least two stations, and M-BSS IDs for the at least two stations. For example, CA-STF 206 (or HE access point 102) may encode TF 810 (FIG. 8), where the TF 810 includes a common address of the at least two VAPs (common VAP ID 207) and M-BSS IDs for the at least two stations (e.g., HE station ID 214.1, 214.2, 214.3, and 214.4, which may be, e.g., a AID and color).

The method 1100 continues at operation 1106 with configuring the access point to transmit the trigger frame to the at least two stations. For example, an apparatus of the HE access point 102 (FIG. 8) may configure the access point to transmit TF 810.

The method 1110 continues at operation 1108 with decoding TB PPDUs from the at least two stations. For example, the HE access point 102 (FIG. 8) may decode the UL MU frames 812 from the HE stations 104.

An apparatus of the HE access point 102 may configure the HE access point 102 to perform one or more of the operations disclosed in conjunction with FIG. 11.

Figure 12:
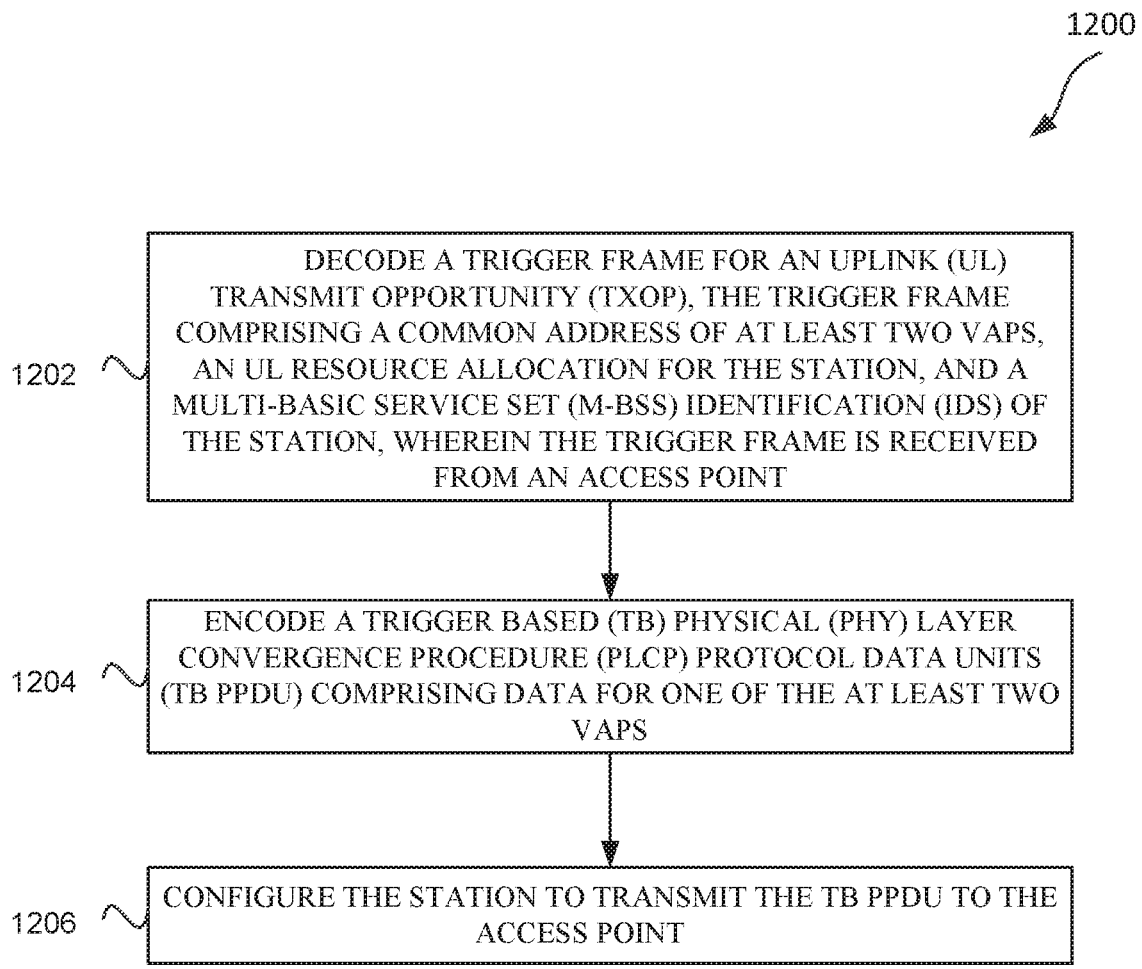
FIG. 12 illustrates a method for coordinated transmission among VAN in accordance with some embodiments.

FIG. 12 illustrates a method 1200 for coordinated transmission among VAPs in accordance with some embodiments. The method 1200 begins at operation 1202 with decoding a trigger frame for an UL TXOP, the trigger frame comprising a common address of at least two VAIN an UL resource allocation for the station, and a M-BSSID of the station, where the trigger frame is received from an access point. For example, HE station 104.1 may decode TF 810.1, which includes common VAP ID 207 that indicates two or more VAPs 202 and HE station ID 214.1 that indicates the HE station 104.1.

The method 1200 continues at operation 1204 with encoding a TB PPDU comprising data for one of the at least two VAPs. For example, the HE station 104.1 (FIG. 8) may encode UL frame 812.1, which may include data and, in some embodiments, may include common VAP ID 207.

The method 1200 continues at operation 1206 with configuring the station to transmit the TB PPDU to the access point in accordance with the resource allocation. For example, an apparatus of the HE station 104.1 (FIG. 8) may configure the HE station 104.1 to transmit the UL frame 812.1.

An apparatus of the HE access point 102 may configure the HE access point 102 to perform one or more of the operations disclosed in conjunction with FIG. 12.

Figure 13:
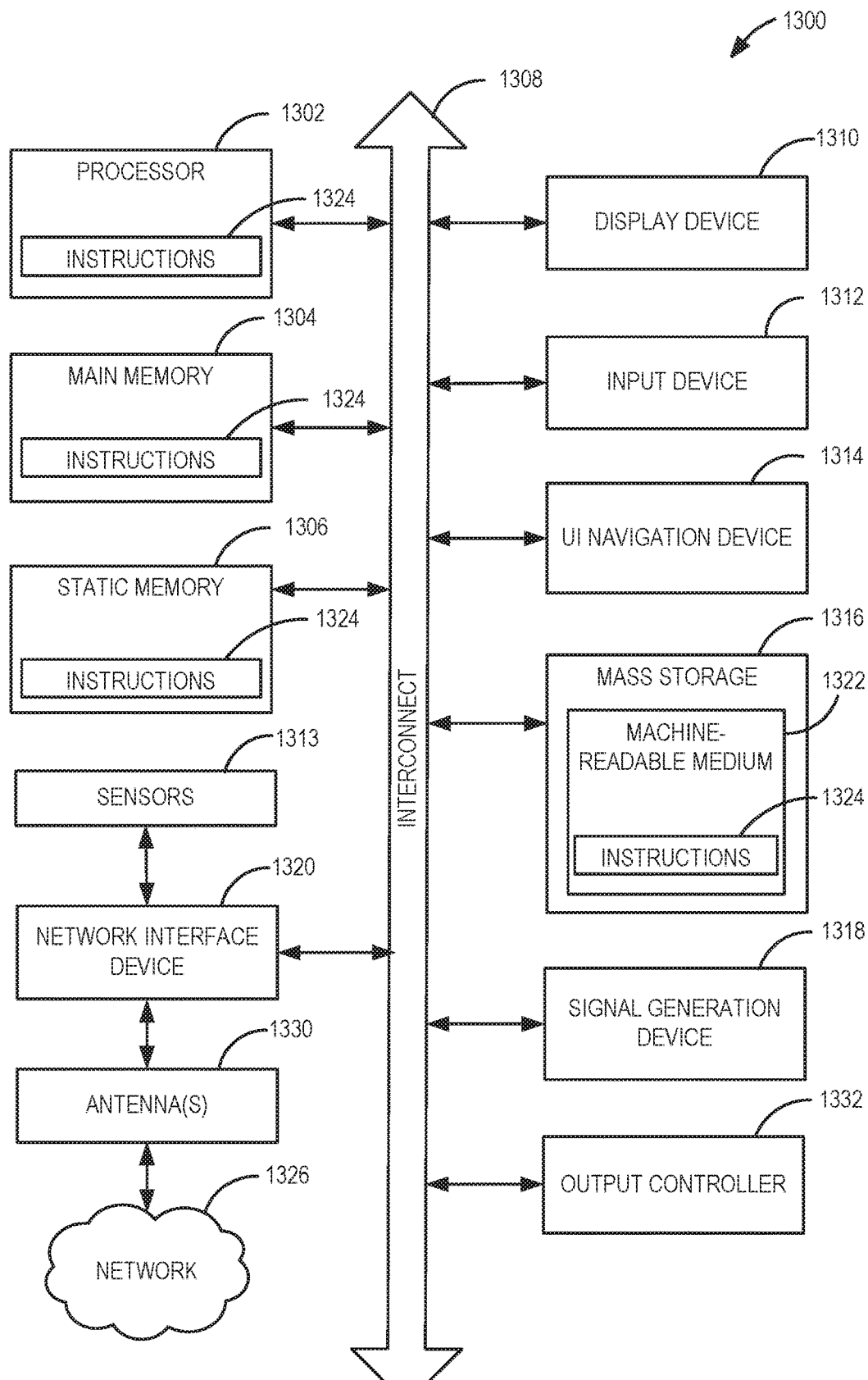
FIG. 13 illustrates a block diagram of an example machine upon which any one or more of the techniques (e.g., methodologies) discussed herein may perform.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a HE access point 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1300 may further include a display device 1310, an input device 1312. (e.g., a keyboard), and a user interface (UI) navigation device 1314 (e.g., a mouse). In an example, the display device 1310, input device 1312 and UI navigation device 1314 may be a touch screen display. The machine 1300 may additionally include a mass storage (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1302 and/or instructions 1324 may comprise processing circuitry and/or transceiver circuitry.

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1322 is illustrated as a single medium, the term "machine readable medium" may include a single medium or multiple media (e.g., a centralized or distributed database, and/or associated caches and servers) configured to store the one or more instructions 1324.

An apparatus of the machine 1300 may be one or more of a hardware processor 1302 (e.g., a central processing unit (CPU), a graphics processing unit (GPU), a hardware processor core, or any combination thereof), a main memory 1304 and a static memory 1306, sensors 1321, network interface device 1320, antennas 1360, a display device 1310, an input device 1312, a UI navigation device 1314, a mass storage 1316, instructions 1324, a signal generation device 1318, and an output controller 1328. The apparatus may be configured to perform one or more of the methods and/or operations disclosed herein. The apparatus may be intended as a component of the machine 1300 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LIE) family of standards, a Universal Mobile Telecommunications System (UMTS) family of standards, peer-to-peer (P2P) networks, among others.

In an example, the network interface device 1320 may include one or more physical jacks (e.g., Ethernet, coaxial, or phone jacks) or one or more antennas to connect to the communications network 1326. In an example, the network interface device 1320 may include one or more antennas 1360 to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of an access point including: a memory; and processing circuitry coupled to the memory, where the processing circuitry is configured to: determine to share a multi-station uplink (UL) transmission opportunity (TXOP) with two stations that are associated with two virtual access points (VAPs), where each of the two stations is associated with one of the two VAPs; determine UL resource allocations for the two stations for a trigger frame based on information received from the two VAPs; encode the trigger frame for the multi-station UL TXOP, the trigger frame including a common VAP identification (ID) of the two VAPs, UL resource allocations for the two stations, and multi-basic service set (M-BSS) identifications (IDs) for each of the two stations; configure the access point to transmit the trigger frame to the two stations; and decode trigger based (TB) physical (PHY) layer convergence procedure (PLCP) protocol data units (TB PPDUs) from the at least two stations in accordance with the UL resource allocations for the two stations.

In Example 2, the subject matter of Example 1 optionally includes where the common VAP ID of the two VAPs is a VAP media access control (MAC) level ID or a physical (PHY) level ID of the access point.

In Example 3, the subject matter of Example 2 optionally includes where the PHY level ID is a color and the VAP level ID is a basic service set (BSS) ID.

In Example 4, the subject matter of any one or more of Examples 1-3 optionally include where the M-BSS IDs for each of the two stations is a station media access control (MAC) level association identification (AID), a station MAC level identification, or a physical (PHY) level identification.

In Example 5, the subject matter of any one or more of Examples 1-4 optionally include where each of the TB PPDUs comprises an M-BSS ID of the M-BSS IDs, and where the processing circuitry is further configured to: determine which of the two VAPs to send the TB PPDUs based on the M-BSS IDs.

In Example 6, the subject matter of any one or more of Examples 1-5 optionally include where the processing circuitry is further configured to: send the TB PPDUs to a VAP of the at least two VAPs, where the VAP is determined based on the resource allocations.

In Example 7, the subject matter of any one or more of Examples 1-6 optionally include where the processing circuitry is further configured to: determine to share the multi-station UL TXOP with the two VAPs based on receiving an indication from each of the two VAPs that each of the two VAPs has gained access to the wireless medium.

In Example 8, the subject matter of Example 7 optionally includes where the two VAPs each gain access to the wireless medium using enhanced distributed channel access (EDCA) or a distributed coordination function (DCF).

In Example 9, the subject matter of any one or more of Examples 1-8 optionally include where the processing circuitry is further configured to: determine to share the multi-station UL TXOP with the two VAPs based on determining that each of the two VAPs has gained access to the wireless medium based on a shared enhanced distributed channel access (EDCA) or a shared distributed coordination function (DCF).

In Example 10, the subject matter of any one or more of Examples 1-9 optionally include where the processing circuitry is further configured to: assign a group of association identifications (AIDs) to each of the two VAPs for the two VAPs to assign to the two stations for the M-BSS IDs.

In Example 11, the subject matter of any one or more of Examples 1-10 optionally include where the processing circuitry is further configured to: determine to share a multi-station downlink (DL) transmission opportunity (TXOP) with the stations; encode a DL resource allocation element of the trigger frame to comprises DL resource allocations for the two stations, and encode the trigger frame to further comprise DL data for the two stations, the DL resource allocation element including the M-BSS IDs of the two additional stations.

In Example 12, the subject matter of Example 11 optionally includes where the DL resource allocation element is a high efficiency signal B (HE SIG B).

In Example 13, the subject matter of any one or more of Examples 11-12 optionally include where the processing circuitry is further configured to: determine parameters for the trigger frame based on information received from the two VAPs, where the parameters comprise one from the following group: modulation and coding scheme (MCS), TXOP type, bandwidth for the TXOP, transmit power to use for the trigger frame, a target received signal strength indicator, a coding type, an spatial stream allocation, and a resource unit allocation.

In Example 14, the subject matter of Example 13 optionally includes where the information received from the two VAPs comprises an indication of an amount of data for the two stations to upload to the two VAPs.

In Example 15, the subject matter of any one or more of Examples 1-14 optionally include processing circuitry is further configured to: store the TB PPDUs in the memory.

In Example 16, the subject matter of any one or more of Examples 1-15 optionally include ax station.

In Example 17, the subject matter of any one or more of Examples 1-16 optionally include transceiver circuitry coupled to the memory; and, one or more antennas coupled to the transceiver circuitry.

Example 18 is a non-transitory computer-readable storage medium that stores instructions for execution by one or more processors, the instructions to configure the one or more processors to cause an apparatus of an access point to: determine to share a multi-station uplink (UL) transmission opportunity (TXOP) with two stations that are associated with two virtual access points (VAPs); encode a trigger frame for the UL TXOP, the trigger frame including a common address of the two VAPs, UL resource allocations for the two stations, and multi-basic service set (M-BSS) identifications (IDs) for the two stations; configure the access point to transmit the trigger frame to the two stations; and decode trigger based (TB) physical (PHY) layer convergence procedure (PLCP) protocol data units (TB PPDUs) from the two stations.

In Example 19, the subject matter of any one or more of Examples 15-18 optionally include where the common address of the two VAPs is a BSS ID or the BSS ID and a color.

Example 20 is a method performed by an apparatus of a station, the method including: determining to share a multi-station uplink (UL) transmission opportunity (TXOP) with two stations that are associated with two virtual access points (VAPs); determining UL resource allocations for the two stations for a trigger frame based on information received from the two VAPs; encoding the trigger frame for the multi-station UL TXOP, the trigger frame including a common VAP identification (ID) of the two VAPs, UL resource allocations for the two stations, and multi-basic service set (M-BSS) identifications (IDs) for each of the two stations; configuring the access point to transmit the trigger frame to the two stations; and decoding trigger based (TB) physical (PHY) layer convergence procedure (PLCP) protocol data units (TB PPDUs) from the two stations.

In Example 21, the subject matter of Example 20 optionally includes where the common VAP ID of the two VAPs is a VAP media access control (MAC) level ID or a physical (PHY) level ID of the access point, and where the PHY level ID is a color and the VAP level ID is a basic service set (BSS) ID.

Example 22 is an apparatus of a station including: a memory; and processing circuitry couple to the memory, where the processing circuitry is configured to: decode a trigger frame for an uplink (UL) transmit opportunity (TXOP), the trigger frame including a common address of two VAPs, an UL resource allocation for the station, and a multi-basic service set (M-BSS) identification (ID) of the station, where the trigger frame is received from an access point; encode a trigger based (TB) physical (PHY) layer convergence procedure (PLCP) protocol data units (TB PPDU) including data for one of the two VAPs; and configure the station to transmit the TB PPDU to the access point.

In Example 23, the subject matter of Example 22 optionally includes where the common VAP ID of the two VAPs is a VAP media access control (MAC) level ID or a physical (PHY) level ID of the access point.

In Example 24, the subject matter of Example 23 optionally includes where the PHY level ID is a color and the VAP level ID is a basic service set (BSS) ID.

In Example 25, the subject matter of any one or more of Examples 21-24 optionally include transceiver circuitry coupled to the memory; and, one or more antennas coupled to the transceiver circuitry.

Example 26 is an apparatus of an access point including: means for determining to share a multi-station uplink (UL) transmission opportunity (TXOP) with two stations that are associated with two virtual access points (VAPs), where each of the two stations is associated with one of the two VAPs; means for determining UL resource allocations for the two stations for a trigger frame based on information received from the two VAPs; means for encoding the trigger frame for the multi-station UL TXOP, the trigger frame including a common VAP identification (ID) of the two VAPs, UL resource allocations for the two stations, and multi-basic service set (M-BSS) identifications (IDs) for each of the two stations; means for configuring the access point to transmit the trigger frame to the two stations; and means for decoding trigger based (TB) physical (PHY) layer convergence procedure (PLCP) protocol data units (TB PPDUs) from the at least two stations in accordance with the UL resource allocations for the two stations.

In Example 27, the subject matter of Example 26 optionally includes where the common VAP ID of the two VAPs is a VAP media access control (MAC) level ID or a physical (PHY) level ID of the access point.

In Example 28, the subject matter of Example 27 optionally includes where the PRY level ID is a color and the VAP level ID is a basic service set (BSS) ID.

In Example 29, the subject matter of any one or more of Examples 26-28 optionally include where the M-BSS IDs for each of the two stations is a station media access control (MAC) level association identification (AID), a station MAC level identification, or a physical (PHY) level identification.

In Example 30, the subject matter of any one or more of Examples 26-29 optionally include where each of the TB PPDUs comprises an M-BSS ID of the M-BSS IDs, and further including: means for determining which of the two VAPs to send the TB PPDUs based on the M-BSS IDs.

In Example 31, the subject matter of any one or more of Examples 26-30 optionally include means for sending the TB PPDUs to a VAP of the at least two VAPs, where the VAP is determined based on the resource allocations.

In Example 32, the subject matter of any one or more of Examples 26-31 optionally include means for determining to share the multi-station UL TXOP with the two VAPs based on receiving an indication from each of the two VAPs that each of the two VAPs has gained access to the wireless medium.

In Example 33, the subject matter of Example 32 optionally includes where the two VAPs each gain access to the wireless medium using enhanced distributed channel access (EDCA) or a distributed coordination function (DCF).

In Example 34, the subject matter of any one or more of Examples 26-33 optionally include means for determining to share the multi-station UL TXOP with the two VAPs based on determining that each of the two VAPs has gained access to the wireless medium based on a shared enhanced distributed channel access (EDCA) or a shared distributed coordination function (DCF).

In Example 35, the subject matter of any one or more of Examples 26-34 optionally include means for assigning a group of association identifications (AIDs) to each of the two VAPs for the two VAPs to assign to the two stations for the M-BSS IDs.

In Example 36, the subject matter of any one or more of Examples 26-35 optionally include means for determining to share a multi-station downlink (DL) transmission opportunity (TXOP) with the stations; means for encoding a DL resource allocation element of the trigger frame to comprises DL resource allocations for the two stations, and encode the trigger frame to further comprise DL data for the two stations, the DL resource allocation element including the M-BSS IDs of the two additional stations.

In Example 37, the subject matter of Example 36 optionally includes where the DL resource allocation element is a high efficiency signal B (HE SIG B).

In Example 38, the subject matter of any one or more of Examples 36-37 optionally include means for determining parameters for the trigger frame based on information received from the two VAPs, where the parameters comprise one from the following group: modulation and coding scheme (MCS), TXOP type, bandwidth for the TXOP, transmit power to use for the trigger frame, a target received signal strength indicator, a coding type, an spatial stream allocation, and a resource unit allocation.

In Example 39, the subject matter of Example 38 optionally includes where the information received from the two VAPs comprises an indication of an amount of data for the two stations to upload to the two VAPs.

In Example 40, the subject matter of any one or more of Examples 26-39 optionally include means for storing the TB PPDUs in the memory.

In Example 41, the subject matter of any one or more of Examples 26-40 optionally include ax station.

In Example 42, the subject matter of any one or more of Examples 26-41 optionally include means for processing radio frequency signals coupled to a means for storing and retrieving data; and, means for transmitting and receiving the radio frequency signals.

Example 43 is a non-transitory computer-readable storage medium that stores instructions for execution by one or more processors, the instructions to configure the one or more processors to cause an apparatus of a station to: decode a trigger frame for an uplink (UL) transmit opportunity (TXOP), the trigger frame including a common address of two VAPs, an UL, resource allocation for the station, and a multi-basic service set (M-BSS) identification (ID) of the station, where the trigger frame is received from an access point; encode a trigger based (TB) physical (PHY) layer convergence procedure (PLCP) protocol data units (TB PPDU) including data for one of the two VAPs; and configure the station to transmit the TB PPDU to the access point.

In Example 44, the subject matter of Example 43 optionally includes where the common VAP ID of the two VAPs is a VAP media access control (MAC) level ID or a physical (PHY) level ID of the access point.

In Example 45, the subject matter of any one or more of Examples 43-44 optionally include where the PRY level ID is a color and the VAP level ID is a basic service set (BSS) ID.

Example 46 is a method performed by an apparatus of a station, the method including: decoding a trigger frame for an uplink (UL) transmit opportunity (TXOP), the trigger frame including a common address of two VAPs, an resource allocation for the station, and a multi-basic service set (M-BSS) identification (ID) of the station, where the trigger frame is received from an access point; encoding a trigger based (TB) physical (PRY) layer convergence procedure (PLCP) protocol data units (TB PPDU) including data for one of the two VAPs; and configuring the station to transmit the TB PPDU to the access point.

In Example 47, the subject matter of Example 46 optionally includes where the common VAP ID of the two VAPs is a VAP media access control (MAC) level ID or a physical (PHY) level ID of the access point.

In Example 48, the subject matter of any one or more of Examples 46-47 optionally include where the PEW level ID is a color and the VAP level ID is a basic service set (BSS) ID.

Example 49 is an apparatus of a station, the apparatus including: means for decoding a trigger frame for an uplink (UL) transmit opportunity (TXOP), the trigger frame including a common address of two VAPs, an UL resource allocation for the station, and a multi-basic service set (M-BSS) identification (ID) of the station, where the trigger frame is received from an access point; means for encoding a trigger based (TB) physical (PITY) layer convergence procedure (PLCP) protocol data units (TB PPDU) including data for one of the two VAPs; and means for configuring the station to transmit the TB PPDU to the access point.

In Example 50, the subject matter of Example 49 optionally includes where the common VAP ID of the two VAPs is a VAP media access control (MAC) level ID or a physical (PHY) level ID of the access point.

In Example 51, the subject matter of any one or more of Examples 49-50 optionally include where the PRY level ID is a color and the VAP level ID is a basic service set (BSS) ID.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point comprising: a memory; and processing circuitry coupled to the memory, wherein the processing circuitry is configured to:
  determine to share a multi-station uplink (UL) transmission opportunity (TXOP) with a first station associated with a first virtual access point (VAP) and a second station associated with a second VAP;
  determine UL resource allocations for the first station and the second station for a trigger frame based on information received from the first VAP and the second VAP;
  encode the trigger frame for the multi-station UL TXOP, the trigger frame comprising a common VAP identification (ID) of the first VAP and the second VAP as a transmitter address, the common VAP ID to indicate the trigger frame is from both the first VAP and the second VAP, UL resource allocations for the first station and the second station, and a first multi-basic service set (M-BSS) identification (ID) for the first station and a second M-BSS ID for the second station;
  configure the access point to transmit the trigger frame to the first station and the second station; and
  decode trigger based (TB) physical (PHY) layer convergence procedure (PLCP) protocol data units (TB PPDUs) from the first station and the second station in accordance with the UL resource allocations for the first station and the second station.

2. The apparatus of claim 1, wherein the common VAP ID is a VAP media access control (MAC) level ID or a physical (PHY) level ID of the access point.

3. The apparatus of claim 2, wherein the PHY level ID is a color and the VAP level ID is a basic service set (BSS) ID.

4. The apparatus of claim 1, wherein the first M-BSS ID and the second M-BSS ID are station media access control (MAC) level association identifications (IDs), station MAC level IDs, or physical (PHY) level IDs.

5. The apparatus of claim 1, wherein a first TB PPDU of the TB PPDUs from the first station comprises the first M-BSS ID and a second TB PPDU of the TB PPDUs from the second station comprises a second M-BSS ID of the second station, and wherein the processing circuitry is further configured to:
send the first TB PPDU to the first VAP based on the first M-BSS ID and send the second TB PPDU to the second VAP based on the second M-BSS ID.

6. The apparatus of claim 1, wherein the processing circuitry is further configured to:
send the TB PPDUs to the first VAP or the second VAP based on the resource allocations.

7. The apparatus of claim 1, wherein the processing circuitry is further configured to:
determine to share the multi-station UL TXOP with the first VAP and the second VAP based on receiving an indication from the first VAP and the second VAP that each has gained access to a wireless medium.

8. The apparatus of claim 7, wherein the first VAP and the second VAP gain access to the wireless medium using enhanced distributed channel access (EDCA) or a distributed coordination function (DCF).

9. The apparatus of claim 1, wherein the processing circuitry is further configured to:
determine to share the multi-station UL TXOP with the first VAP and the second VAP based on determining that the first VAP and the second VAP has gained access to the wireless medium based on a shared enhanced distributed channel access (EDCA) or a shared distributed coordination function (DCF).

10. The apparatus of claim 1, wherein the processing circuitry is further configured to:
assign a group of association identifications (AIDs) to the first VAP and the second VAP, wherein the AIDs are for the first VAP and the second VAP to assign to the first station and the second station as the first M-BSS ID and the second M-BSS ID, respectively.

11. The apparatus of claim 1, wherein the processing circuitry is further configured to:
determine to share a multi-station downlink (DL) transmission opportunity (TXOP) with the first station and the second station;
encode a DL resource allocation element of the trigger frame to comprises DL resource allocations for the first station and the second station, and encode the trigger frame to further comprise DL data for the first station and the second station, the DL resource allocation element comprising the first M-BSS ID and the second M-BSS ID.

12. The apparatus of claim 11, wherein the DL resource allocation element is a high efficiency signal B (HE SIG B).

13. The apparatus of claim 11, wherein the processing circuitry is further configured to:
determine parameters for the trigger frame based on information received from the first VAP and the second VAP, wherein the parameters comprise one from the following group: modulation and coding scheme (MCS), TXOP type, bandwidth for the TXOP, transmit power to use for the trigger frame, a target received signal strength indicator, a coding type, an spatial stream allocation, and a resource unit allocation.

14. The apparatus of claim 13, wherein the information received from the first VAP and the second VAP comprises an indication of an amount of data for the first station and the second station to upload to the first VAP and the second VAP.

15. The apparatus of claim 1, processing circuitry is further configured to:
store the TB PPDUs in the memory.

16. The non-transitory computer-readable storage medium of claim 15, wherein the common VAP ID is a VAP media access control (MAC) level ID or a physical (PHY) level ID of the access point, and wherein the PHY level ID is a color and the VAP level ID is a basic service set (BSS) ID.

17. The apparatus of claim 1, wherein the first station, the second station, and the access point are each one or more from the following group: an Institute of Electrical and Electronic Engineers (IEEE) 802.11ax access point, an IEEE 802.11 station, an IEEE access point, a station acting as a group owner (GO), and an IEEE 802.11ax station.

18. The apparatus of claim 1, further comprising transceiver circuitry coupled to the memory; and, one or more antennas coupled to the transceiver circuitry.

19. A non-transitory computer-readable storage medium that stores instructions for execution by one or more processors, the instructions to configure the one or more processors to cause an apparatus of an access point to:
determine to share a multi-station uplink (UL) transmission opportunity (TXOP) with a first station associated with a first virtual access point (VAP) and a second station associated with a second VAP;
determine UL resource allocations for the first station and the second station for a trigger frame based on information received from the first VAP and the second VAP;
encode the trigger frame for the multi-station UL TXOP, the trigger frame comprising a common VAP identification (ID) of the first VAP and the second VAP as a transmitter address, the common VAP ID to indicate the trigger frame is from both the first VAP and the second VAP, UL resource allocations for the first station and the second station, and a first multi-basic service set (M-BSS) identification (ID) for the first station and a second M-BSS ID for the second station;
configure the access point to transmit the trigger frame to the first station and the second station;
decode trigger based (TB) physical (PHY) layer convergence procedure (PLCP) protocol data units (TB PPDUs) from the first station and the second station in accordance with the UL resource allocations for the first station and the second station.

20. A method performed by an apparatus of a station, the method comprising:
determining to share a multi-station uplink (UL) transmission opportunity (TXOP) with a first station associated with a first virtual access point (VAP) and a second station associated with a second VAP;
determining UL resource allocations for the first station and the second station for a trigger frame based on information received from the first VAP and the second VAP;
encoding the trigger frame for the multi-station UL TXOP, the trigger frame comprising a common VAP identification (ID) of the first VAP and the second VAP as a transmitter address, the common VAP ID to indicate the trigger frame is from both the first VAP and the second VAP, UL resource allocations for the first station and the second station, and a first multi-basic service set (M-BSS) identification (ID) for the first station and a second M-BSS ID for the second station;

configuring the access point to transmit the trigger frame to the first station and the second station; and decoding trigger based (TB) physical (PHY) layer convergence procedure (PLCP) protocol data units (TB PPDUs) from the first station and the second station in accordance with the UL resource allocations for the first station and the second station.

21. The apparatus of claim 20, wherein the common VAP ID is a VAP media access control (MAC) level ID or a physical (PHY) level ID of the access point, and wherein the PHY level ID is a color and the VAP level ID is a basic service set (BSS) ID.

22. The apparatus of claim 21, further comprising transceiver circuitry coupled to the memory; and, one or more antennas coupled to the transceiver circuitry.

\* \* \* \* \*